United States Patent
Kim et al.

(10) Patent No.: US 9,851,495 B2
(45) Date of Patent: Dec. 26, 2017

(54) BACKLIGHT UNIT HAVING A BENT SUBSTRATE AND DISPLAY DEVICE INCLUDING THE SAME

(71) Applicant: LG ELECTRONICS INC., Seoul (KR)

(72) Inventors: Jaehyeok Kim, Seoul (KR); Wondo Kee, Seoul (KR); Woongjoon Hwang, Seoul (KR); Jeoungoun Lee, Seoul (KR); Dohan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/980,734

(22) Filed: Dec. 28, 2015

(65) Prior Publication Data

US 2016/0187573 A1 Jun. 30, 2016

(30) Foreign Application Priority Data

Dec. 31, 2014 (KR) ........................ 10-2014-0195644

(51) Int. Cl.
*F21V 8/00* (2006.01)
*G02F 1/1333* (2006.01)
*G02F 1/1335* (2006.01)

(52) U.S. Cl.
CPC ........... *G02B 6/0088* (2013.01); *G02B 6/009* (2013.01); *G02B 6/0083* (2013.01); *G02F 1/133308* (2013.01); *G02F 1/133615* (2013.01); *G02B 6/0055* (2013.01); *G02B 6/0085* (2013.01); *G02F 1/133608* (2013.01); *G02F 2001/133314* (2013.01)

(58) Field of Classification Search
CPC .... G02B 6/0088; G02B 6/0083; G02B 6/009; G02B 6/0085; G02B 6/0055; G02F 1/133308; G02F 1/133615; G02F 1/133608; G02F 2001/133314
See application file for complete search history.

(56) References Cited

U.S. PATENT DOCUMENTS

2009/0116262 A1   5/2009   Park
2011/0025942 A1   2/2011   Lee
2011/0109844 A1   5/2011   Go et al.
(Continued)

FOREIGN PATENT DOCUMENTS

EP   2 405 188   1/2012
EP   2 749 935   7/2014

OTHER PUBLICATIONS

European Search Report dated May 4, 2016 issued in Application No. 15202903.9.
(Continued)

*Primary Examiner* — Tracie Y Green
(74) *Attorney, Agent, or Firm* — Ked & Associates, LLP

(57) ABSTRACT

A backlight unit and a display device including the same are provided. The display device includes: a bottom cover; a backlight unit in which a light assembly is disposed in at least one corner area of the bottom cover; and a light arriving portion formed by bending at least one corner area of the bottom cover, wherein the backlight unit includes: a substrate coupled to the light arriving portion and in which a first surface in which the light assembly is disposed and a second surface bent from the first surface are provided, and at the first and second surfaces, a plurality of leads connected to the light assembly are disposed.

15 Claims, 47 Drawing Sheets

(56) References Cited

U.S. PATENT DOCUMENTS

2012/0026424 A1  2/2012  Youk et al.
2013/0258251 A1  10/2013 Lee et al.
2014/0183571 A1  7/2014  Lee et al.
2014/0198530 A1  7/2014  Hong et al.

OTHER PUBLICATIONS

European Office Action dated Jun. 28, 2017 issued in Application No. 15202903.9.

FIG. 7
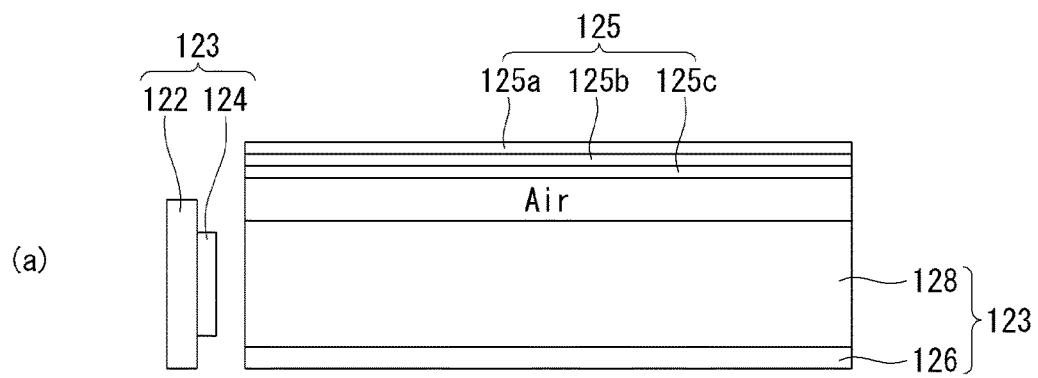
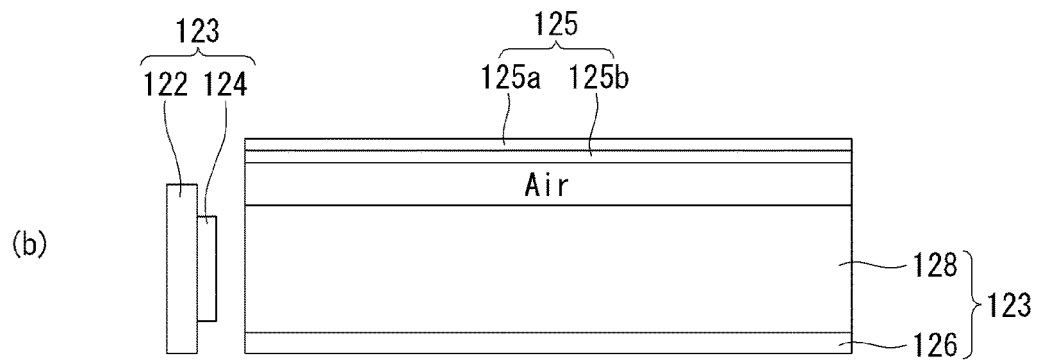

FIG. 11
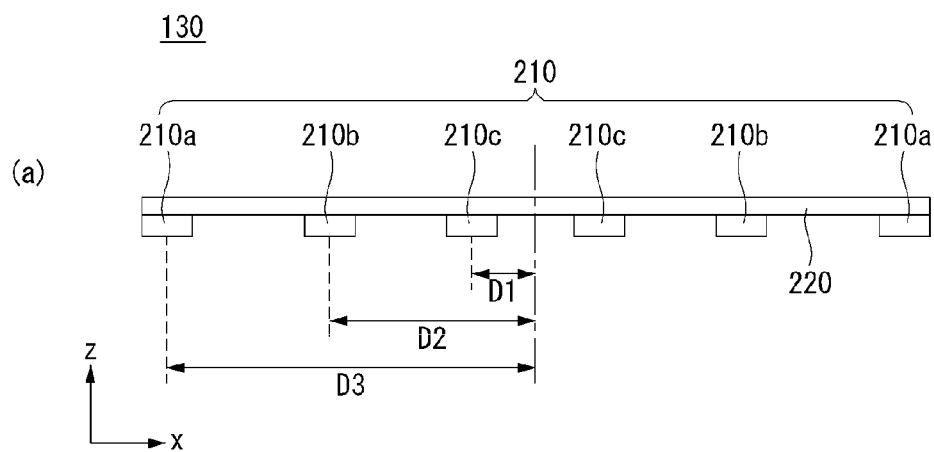
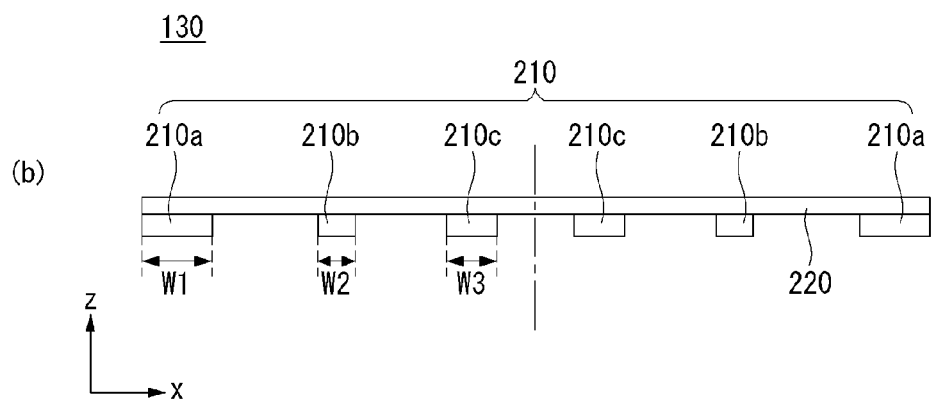

FIG. 13
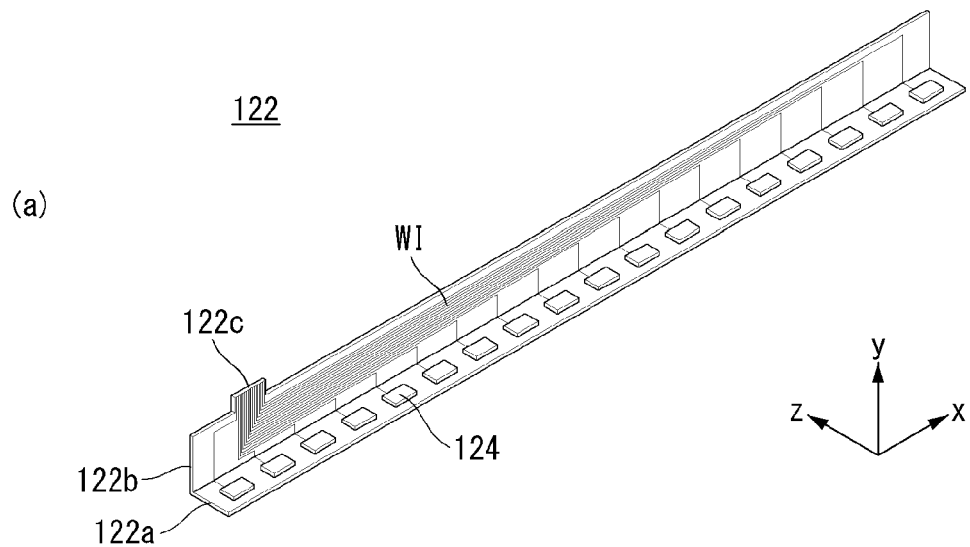
(a)
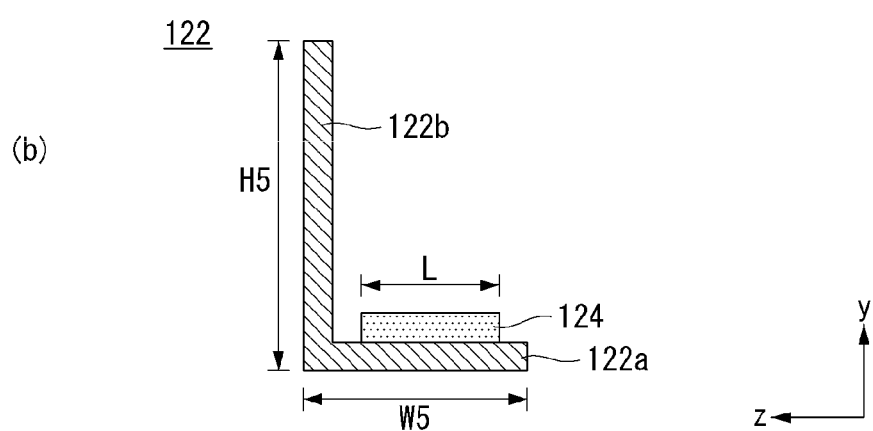
(b)

FIG. 20
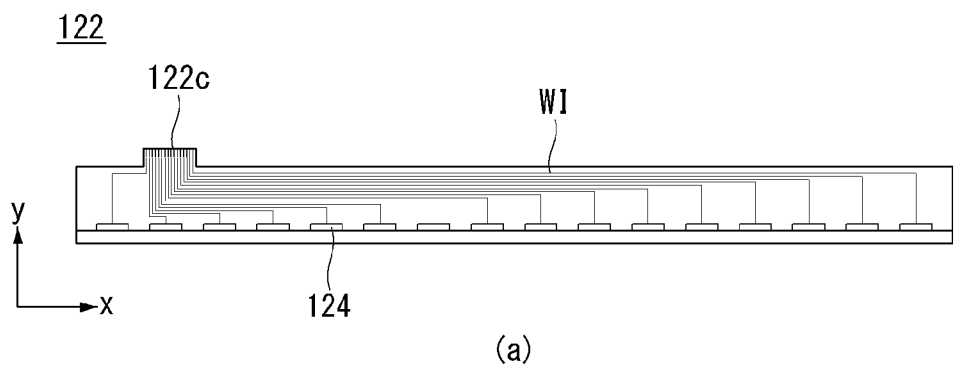
(a)
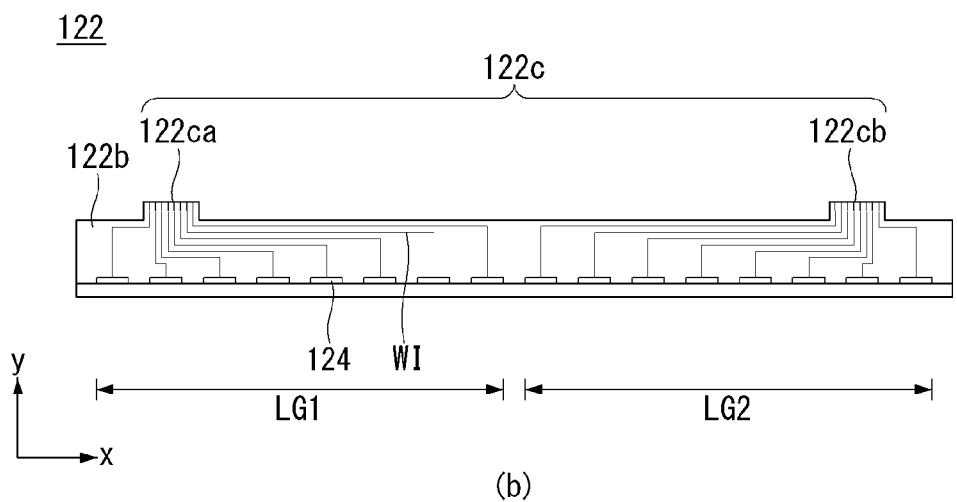
(b)

FIG. 28
(a)
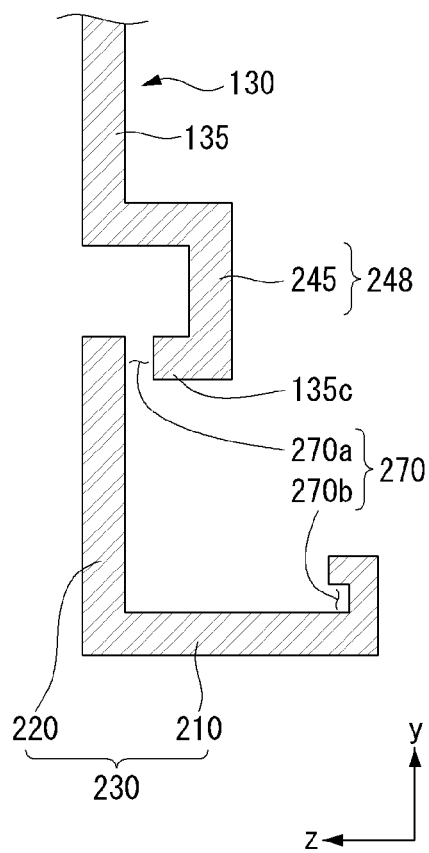
(b)
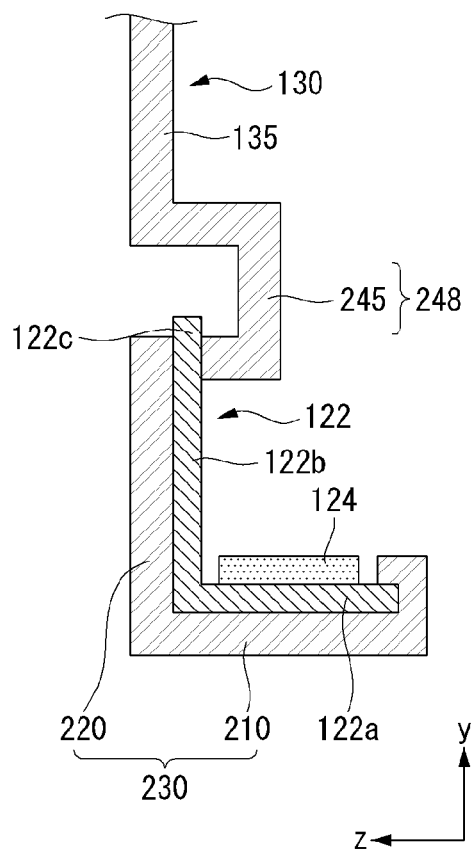

FIG. 31
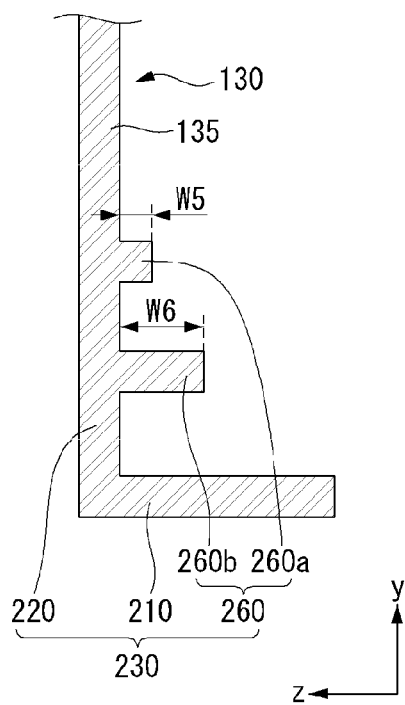
(a)
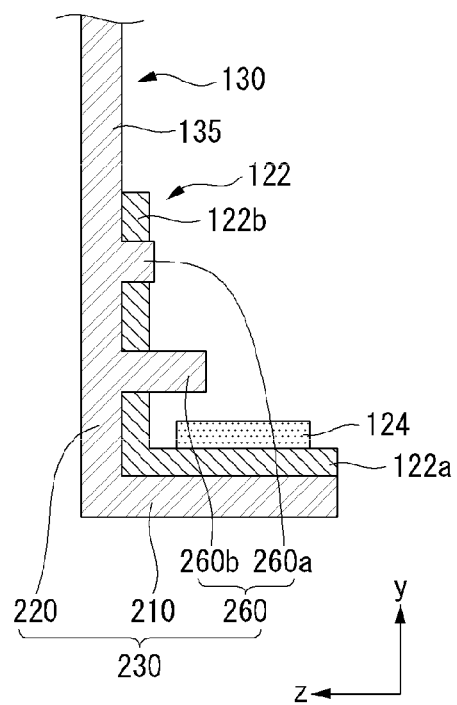
(b)

FIG. 34
(a)
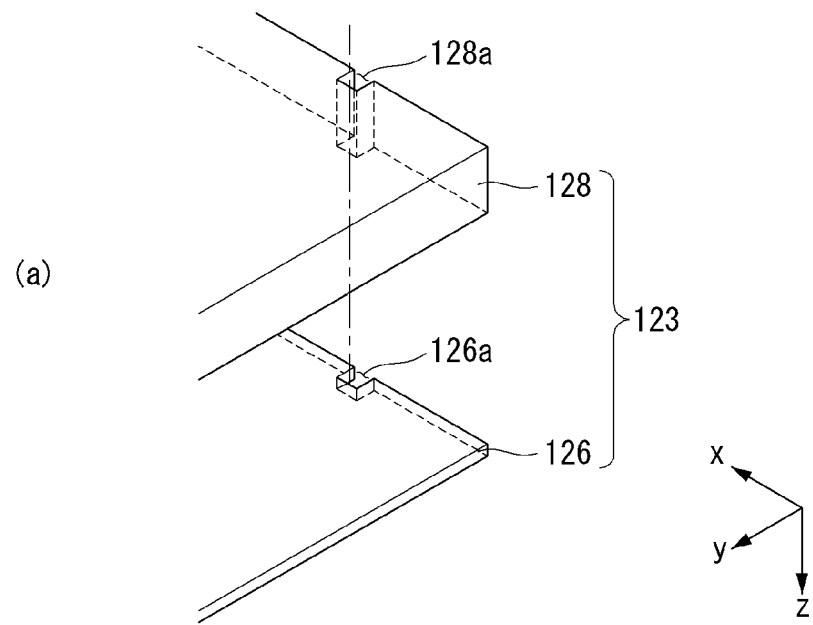
(b)
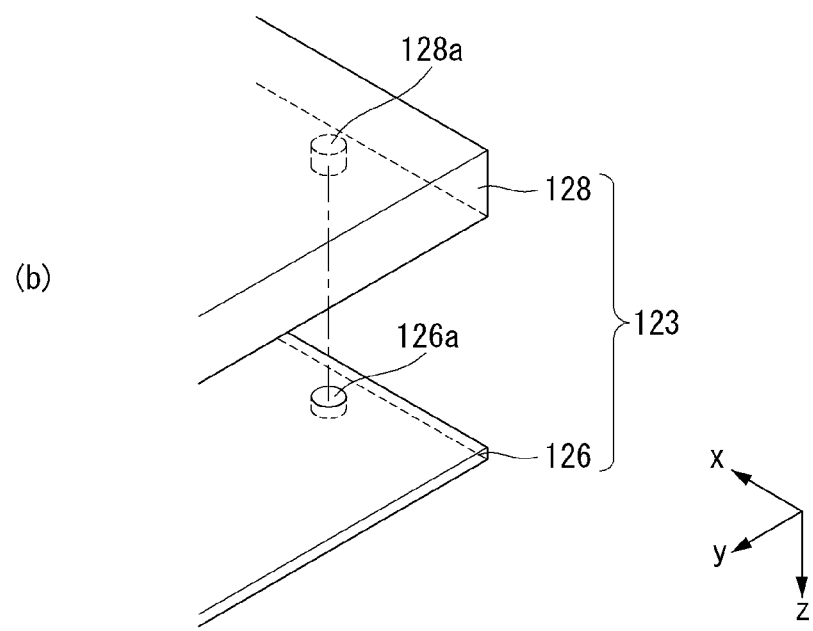

BACKLIGHT UNIT HAVING A BENT SUBSTRATE AND DISPLAY DEVICE INCLUDING THE SAME

CROSS-REFERENCE TO RELATED APPLICATION(S)

Pursuant to 35 U.S.C. §119(a), this application claims the benefit of earlier filing date and right of priority to Korean Patent Application No. 10-2014-0195644, filed on Dec. 31, 2014, the contents of which are incorporated by reference herein in their entirety.

BACKGROUND

1. Field

The present disclosure relates to a backlight unit including a bent substrate and a display device including the same.

2. Background

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices. Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

The above references are incorporated by reference herein where appropriate for appropriate teachings of additional or alternative details, features and/or technical background.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIGS. 3 to 9 are views illustrating a configuration of a display device according to an exemplary embodiment of the present disclosure;

FIGS. 10 to 12 are views illustrating a flange according to an exemplary embodiment of the present disclosure;

FIGS. 13 to 21 are views illustrating a substrate according to an exemplary embodiment of the present disclosure;

FIGS. 24 to 46 are views illustrating a coupling structure according to an exemplary embodiment of the present disclosure.

DETAILED DESCRIPTION

Figure 1:
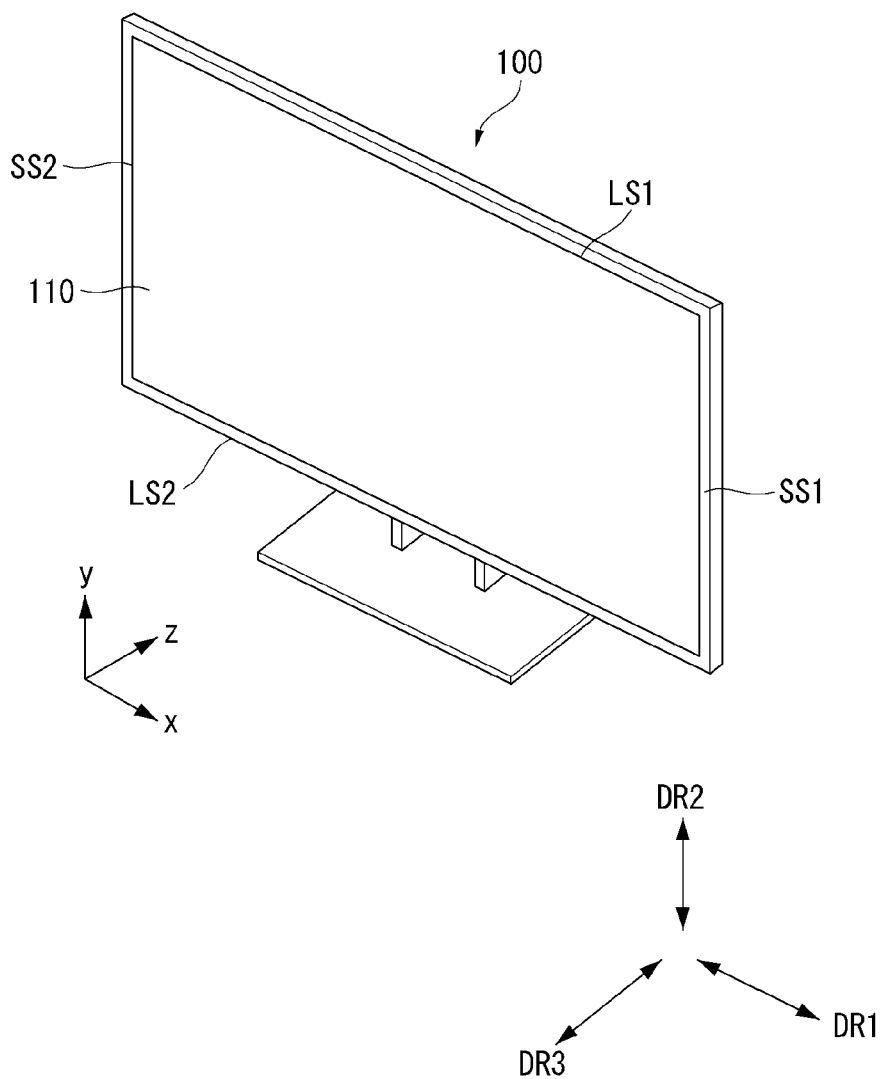
FIGS. 1 and 2 are perspective views illustrating a display device according to an exemplary embodiment of the present disclosure.

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A display device may be described below with reference to the accompanying drawings. In the following description, suffixes "module" and "unit" may be given to components of the mobile terminal in consideration of only facilitation of description and do not have meanings or functions discriminated from each other.

The terms 'first', 'second', etc., may be used to describe various components, but the components are not limited by such terms. The terms are used only for the purpose of distinguishing one component from other components. For example, a first component may be designated as a second component without departing from the scope of the present disclosure. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present disclosure. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present disclosure pertains. The terms defined in a generally used dictionary must be understood to have meanings identical to those used in the context of a related art, and are not to be construed to have ideal or excessively formal meanings unless they are obviously specified in the present application.

The following exemplary embodiments of the present disclosure are provided to those skilled in the art in order to describe the present disclosure more completely. Accordingly, shapes and sizes of elements shown in the drawings may be exaggerated for clarity.

Hereinafter, a liquid crystal display panel is used as an example of a display panel. Other display panels may be used. For example, a plasma display panel (PDP), a field emission display (FED) panel, and an organic light emitting display panel may be used.

Hereinafter, as a display panel, a liquid crystal panel is exemplified, but a display panel that can apply to the present disclosure is not limited to the liquid crystal panel but may be a Plasma Display Panel (PDP), a Field Emission Display (FED), and an Organic Light Emitting Display (OLED).

Hereinafter, a display panel 110 may include a First Long Side (LS1), a Second Long Side (LS2) opposite to the LS1, a First Short Side (SS1) adjacent to the LS1 and the LS2, and a Second Short Side (SS2) opposite to the SS1.

Here, the SS1 may be referred to as a first side area, the SS2 may be referred to as a second side area opposite to the first side area, the LS1 may be referred to as a third side area adjacent to the first side area and the second side area and located between the first side area and the second side area, and the LS2 may be referred to as a fourth side area adjacent to the first side area and the second side area, located between the first side area and the second side area, and opposite to the third side area.

Further, for convenience of description, it is described that a length of the LS1 and LS2 is longer than that of the SS1 and SS2, but a length of the LS1 and LS2 may be approximately the same as that of the SS1 and SS2.

Hereinafter, a First Direction (DR1) may be a direction parallel to the LS1 and LS2 of the display panel 100, and a Second Direction (DR2) may be a direction parallel to the SS1 and SS2 of the display panel 110.

A Third Direction (DR3) may be a direction vertical to the DR1 and/or the DR2.

The DR1 and the DR2 may be referred to as a horizontal direction.

Further, the DR3 may be referred to as a vertical direction.

Figure 2:
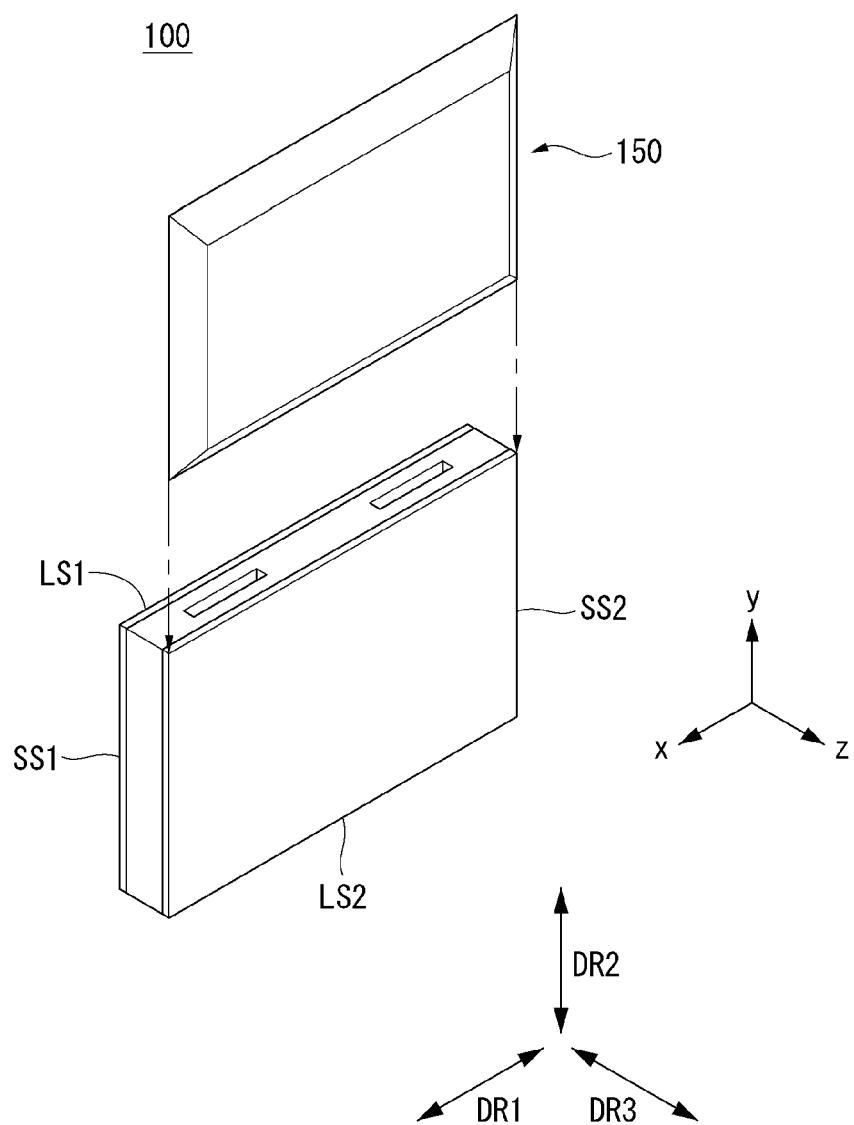

FIGS. 1 and 2 are perspective views illustrating a display device according to an exemplary embodiment of the present disclosure.

As shown in FIGS. 1 and 2, a display device 100 according to an exemplary embodiment of the present disclosure may include a display panel 110 and a back cover 150 of the rear side of the display panel 110.

The back cover 150 may be connected to the display panel 110 with a sliding method in a direction from the LS1 toward the LS2, i.e., in the DR2. In other words, the back cover 150 may be inserted with a sliding method from the SS1 of the display panel 110, the SS2 opposite to the SS1, and the LS1 adjacent to the SS1 and SS2 and located between the SS1 and the SS2.

In order to connect the back cover 150 to the display panel 110 with a sliding method, the back cover 150 and/or other structures adjacent thereto may include a protruding portion, a sliding portion, and a coupler.

FIGS. 3 to 7 are views illustrating a configuration of a display device according to an exemplary embodiment of the present disclosure.

Figure 3:
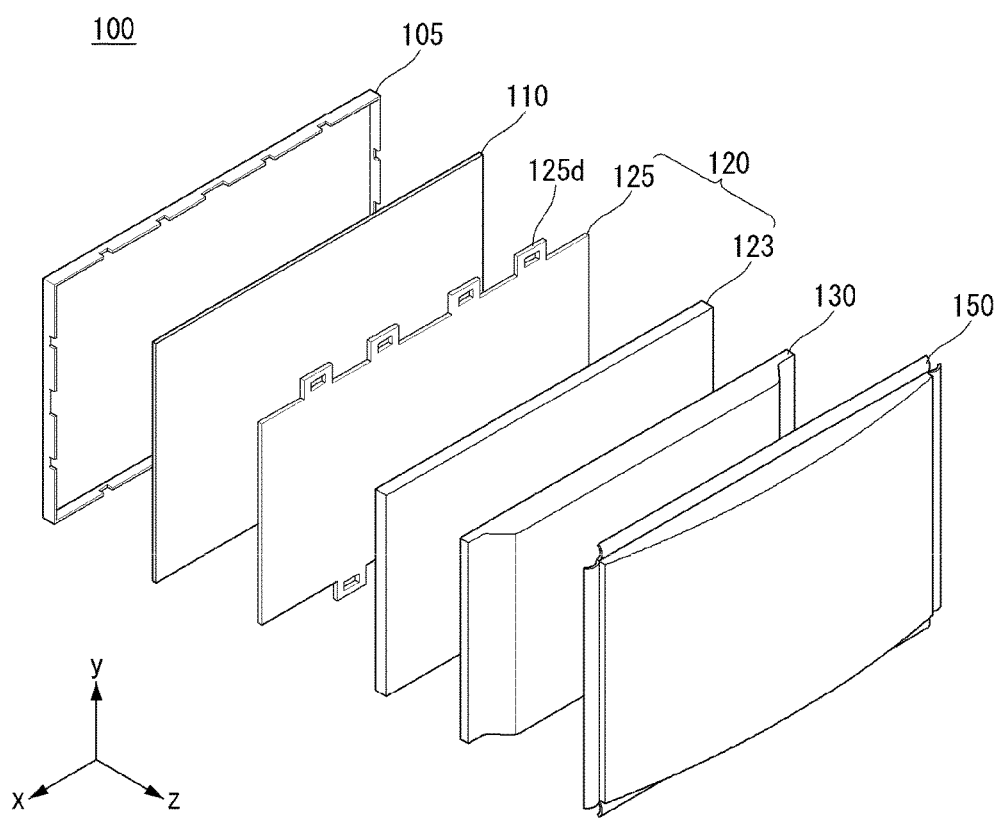

As shown in FIG. 3, the display device 100 according to an exemplary embodiment of the present disclosure may include a front cover 105, a display panel 110, a backlight unit 120, a bottom cover 130, and a back cover 150.

The front cover 105 may cover at least a partial area of a front surface and a side surface of the display panel 110. The front cover 105 may have a quadrangular frame shape having the hollow center. Because the front cover 105 has the hollow center, an image of the display panel 110 may be displayed to the outside.

The front cover 105 may be divided into a front surface cover and a side surface cover. That is, the front cover 105 may be divided into a front surface cover located at the front surface side of the display panel 110 and a side surface cover located at the side surface side of the display panel 110. The front surface cover and the side surface cover may be separately formed. Any one of the front surface cover and the side surface cover may be omitted. For example, for an object of an enhanced design, the front surface cover may not exist and only a side surface cover may exist.

The display panel 110 is provided at a front surface of the display device 100 and may display an image. The display panel 110 may divide an image into a plurality of pixels to output an image by adjusting color, brightness, and chroma per pixel. The display panel 110 may be divided into an active area that displays an image and an inactive area that does not display an image. The display panel 110 may include an opposing front substrate and rear substrate with a liquid crystal layer interposed therebetween.

The front substrate may include a plurality of pixels consisting of red (R), green (G), and blue (B) subpixels. The front substrate may generate an image corresponding to a color of red, green, or blue according to a control signal.

The rear substrate may include switching elements. The rear substrate may switch a pixel electrode. For example, the pixel electrode may change molecule arrangement of a liquid crystal layer according to a control signal applied from the outside. The liquid crystal layer may include a plurality of liquid crystal molecules. The liquid crystal molecules may change arrangement to correspond to a voltage difference occurring between a pixel electrode and a common electrode. The liquid crystal layer may transfer light provided from the backlight unit 120 to the front substrate.

The backlight unit 120 may be located at the rear surface side of the display panel 110. The backlight unit 120 may include a plurality of light sources. A light source of the backlight unit 120 may be disposed in a direct type or an edge type. When the backlight unit 120 is a direct type backlight unit 120, a diffusion plate may be further included.

The backlight unit 120 may be coupled to a front surface and a surface side of the bottom cover 130. For example, a plurality of light sources may be disposed at the inside of one side of the bottom cover 130, and this may be referred to as an edge type backlight unit.

The backlight unit 120 may be driven with an entire driving method or a partial driving method such as local dimming and impulsive. The backlight unit 120 may include an optical sheet 125 and an optical layer 123.

The optical sheet 125 may enable light of a light source to be uniformly transferred to the display panel 110. The optical sheet 125 may be formed with a plurality of layers. For example, the optical sheet 125 may include at least one prism sheet and/or at least one diffusion sheet.

In the optical sheet 125, at least one coupler 125*d* may exist. The coupler 125*d* may be coupled to the front cover 105 and/or the back cover 150. That is, the coupler 125*d* may be directly coupled to the front cover 105 and/or the back cover 150. Alternatively, the coupler 125*d* may be coupled to a structure coupled onto the front cover 105 and/or the back cover 150. That is, the coupler 125*d* may be indirectly coupled to the front cover 105 and/or the back cover 150.

The optical layer 123 may include a light source. A detailed configuration of the optical layer 123 will be described in a corresponding portion.

The bottom cover 130 may perform a function of supporting constituent elements of the display device 100. For example, a configuration of the backlight unit 120 may be coupled to the bottom cover 130. The bottom cover 130 may be made of a metal material such as an aluminum alloy. The bottom cover 130 may be referred to as a frame.

The back cover 150 may be located at a rear surface of the display device 100. The back cover 150 may protect an internal configuration from the outside. At least a portion of the back cover 150 may be coupled to the bottom cover 130 and/or the front cover 105. The back cover 150 may be an injection material made of a resin material.

Figure 4:
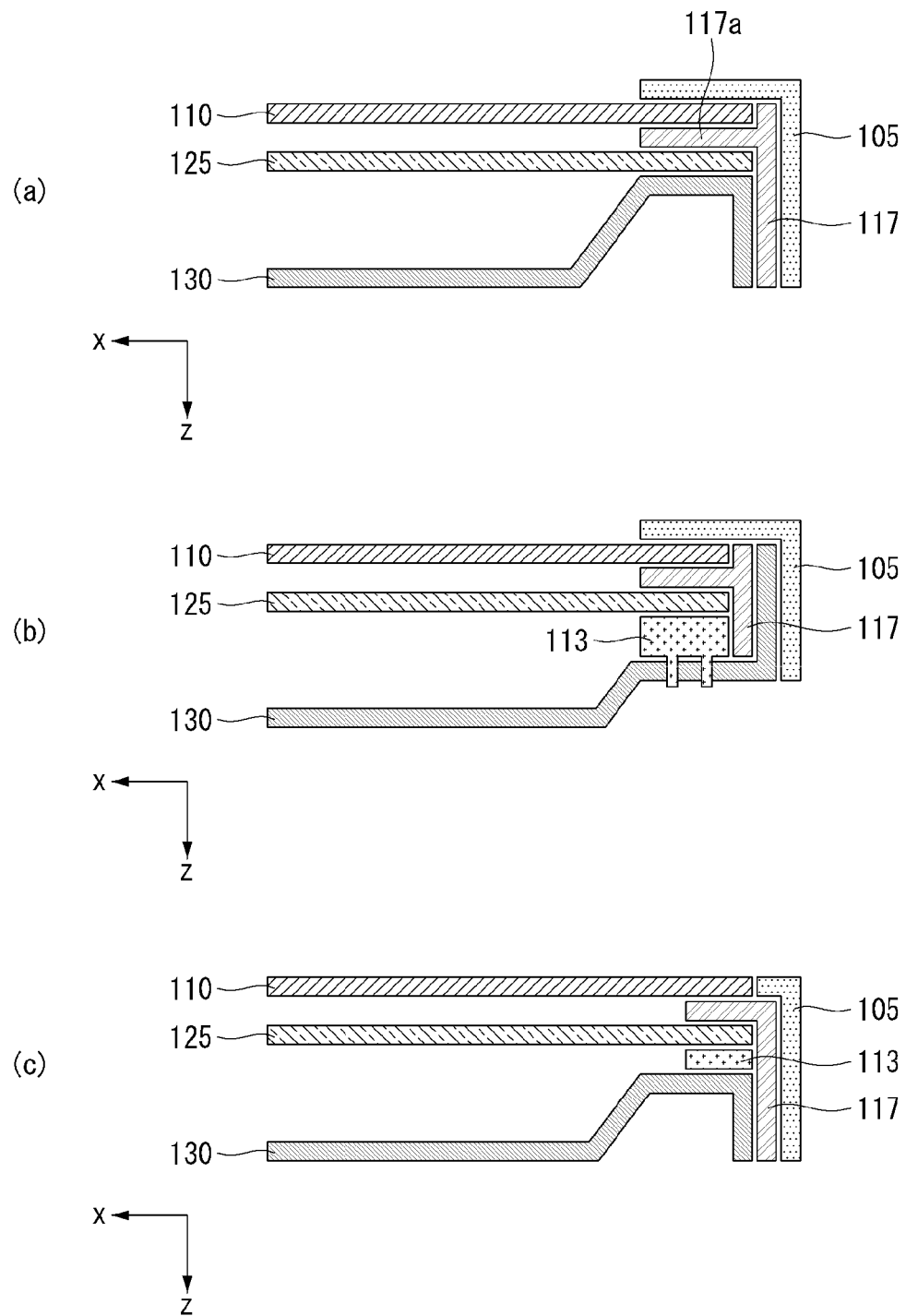
Figure 5:
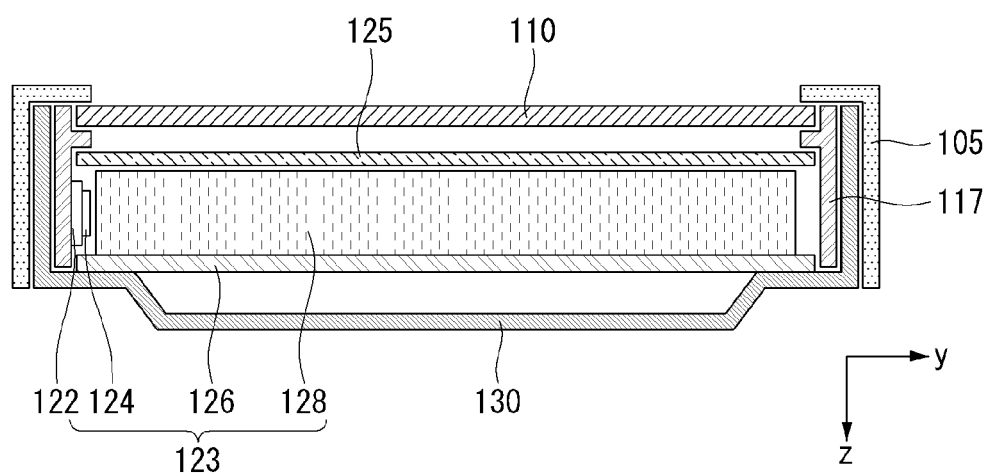

FIGS. 4 and 5 are cross-sectional views illustrating a configuration of the optical sheet 125.

As shown in FIG. 4A, in an upper portion of the bottom cover 130, the optical sheet 125 may be located. The optical sheet 125 may be coupled to the bottom cover 130 at an edge of the bottom cover 130. The optical sheet 125 may be directly received at an edge of the bottom cover 130. That is, the optical sheet 125 may be supported by the bottom cover 130. An upper surface of an edge of the optical sheet 125 may be enclosed by a first guide panel 117. For example, the optical sheet 125 may be located between an edge of the bottom cover 130 and a flange 117a of the first guide panel 117.

At the front surface side of the optical sheet 125, the display panel 110 may be located. An edge of the display panel 110 may be coupled to the first guide panel 117. That is, the display panel 110 may be supported by the first guide panel 117.

An edge area of the front surface of the display panel 110 may be enclosed by the front cover 105. For example, the display panel 110 may be located between the first guide panel 117 and the front cover 105.

As shown in FIG. 4B, the display device 100 according to an exemplary embodiment of the present disclosure may further include a second guide panel 113. The optical sheet 125 may be coupled to the second guide panel 113. That is, the second guide panel 113 may be coupled to the bottom cover 130, and the optical sheet 125 may be coupled to the second guide panel 113. The second guide panel 113 may be made of a material different from that of the bottom cover 130. The bottom cover 130 may enclose the first and second guide panels 117 and 113.

As shown in FIG. 4C, in the display device 100 according to an exemplary embodiment of the present disclosure, the front cover 105 may not cover a front surface of the display panel 110. That is, one end portion of the front cover 105 may be located at a side surface of the display panel 110.

As shown in FIG. 5, the optical layer 123 may include a substrate 122, a reflection sheet 126, a light assembly 124, and a light guide plate 128.

The optical layer 123 may be located on the bottom cover 130. For example, the optical layer 123 may be located between the bottom cover 130 and the optical sheet 125. The optical layer 123 may be supported by the bottom cover 130.

The substrate 122 may be located in at least one side of the inside of the bottom cover 130. The substrate 122 may be coupled to the first guide panel 117. The substrate 122 may be directly coupled to the first guide panel 117. For example, the substrate 122 may be coupled to at least one of the first guide panel 117, the bottom cover 130, and the front cover 105.

The substrate 122 may be located in a side surface direction of the reflection sheet 126 and/or the light guide plate 128. That is, a front surface of the substrate 122 may face toward the optical layer 123. The substrate 122 and the reflection sheet 126 and/or the light guide plate 128 may be separated by a predetermined gap. A detailed configuration of the substrate 122 and the optical layer 123 may be described in a corresponding portion.

Figure 6:
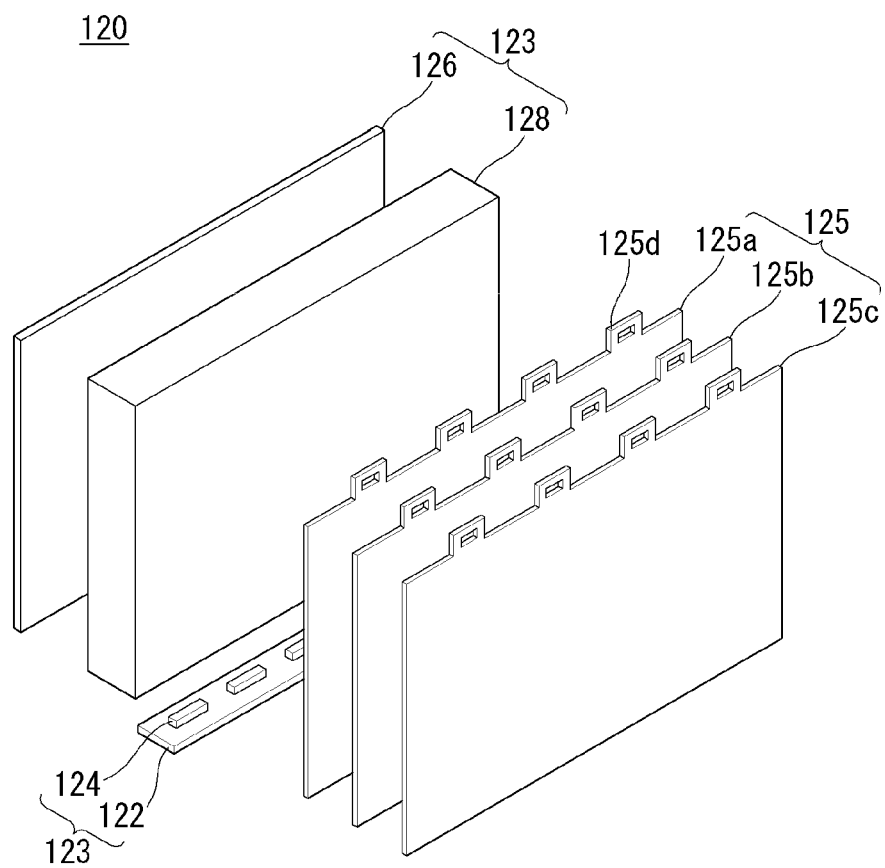

Referring to FIGS. 6 and 7, the backlight unit 120 may include a substrate 122, at least one light assembly 124, an optical layer 123 including the reflection sheet 126 and the light guide plate 128, and an optical sheet 125 located at the front surface side of the optical layer 123.

The substrate 122 may be located in at least one side of another configuration of the optical layer 123. The substrate 122 may be extended in a direction orthogonal to a length direction of another configuration of the optical layer 123.

In the substrate 122, at least one light assembly 124 may be mounted. In the substrate 122, an electrode pattern for connecting an adaptor and the light assembly 124 may be formed. For example, in the substrate 122, a carbon nanotube electrode pattern for connecting the light assembly 124 and an adaptor may be formed.

The substrate 122 may be made of at least one of polyethyleneterephthalate (PET), glass, polycarbonate (PC), and silicon. The substrate 122 may be a Printed Circuit Board (PCB) in which at least one light assembly 124 is mounted.

In the substrate 122, the light assembly 124 may be disposed at a predetermined gap. A length direction width of the light assembly 124 may be smaller than a thickness direction width of the light guide plate 128. Therefore, most of light emitted from the light assembly 124 may be transferred to the inside of the light guide plate 128.

The light assembly 124 may be a light emitting diode (LED) chip or a light emitting diode package including at least one LED chip.

The light assembly 124 may be formed with a color LED that emits at least one of colors such as red, blue, and green or a white LED. The color LED may include at least one of red LED, blue LED, and green LED.

A light source included in the light assembly 124 may be a Chip On Board (COB) type. The COB type light source may directly couple an LED chip, which is a light source to the substrate 122. Therefore, a process can be simplified. Further, resistance can be lowered and thus energy to be lost due to a heat can be reduced. That is, power efficiency of the light assembly 124 can be enhanced. The COB type light source can provide more bright lighting. The COB type light source may be implemented in a smaller thickness and a lighter weight than those of a conventional case.

The light guide plate 128 may be located in an upper portion of the light assembly 124. The light guide plate 128 may perform a function of widely diffusing light applied from the light assembly 124. Although not shown, in the light guide plate 128, the light assembly 124 and an adjacent surface may be formed in a step shape. A lower surface of the light guide plate 128 is formed in a shape inclined upward to reflect light applied from the light assembly 124 upward.

The reflection sheet 126 may be located at the rear surface side of the light guide plate 128. The reflection sheet 126 may reflect light emitted from the light assembly 124 to the front surface side. The reflection sheet 126 may reflect again light reflected from the light guide plate 128 to the front surface side.

The reflection sheet 126 may include at least one of a metal and metal oxide, which is a reflection material. For example, the reflection sheet 126 may include a metal and/or metal oxide having high reflectivity, such as at least one of aluminum (Al), silver (Ag), gold (Au), and titanium dioxide ($TiO_2$).

The reflection sheet 126 may be formed by depositing and/or coating a metal or metal oxide. In the reflection sheet 126, ink including a metal material may be printed. In the reflection sheet 126, a deposition layer using a vacuum deposition method such as a heat deposition method, an evaporation method, or a sputtering method may be formed. In the reflection sheet 126, a coating layer and/or a print layer using a printing method, a gravure coating method, or a silk screen method may be formed.

At front surface side of the light guide plate 128, a diffusion plate (not shown) may be further included. The diffusion plate may diffuse light emitted from the light guide plate 128 to an upper portion.

An air gap may be located between the light guide plate 128 and the optical sheet 125. The air gap may perform a buffer function of widely spreading light emitted from the light assembly 124. A resin may be deposited on the light assembly 124 and/or the reflection sheet 126. The resin may perform a function of diffusing light emitted from the light assembly 124.

The optical sheet 125 may be located at the front surface side of the light guide plate 128. A rear surface of the optical sheet 125 may close contact with the light guide plate 128, and a front surface of the optical sheet 125 may close contact with a rear surface of the display panel 110.

The optical sheet 125 may include at least one sheet. Specifically, the optical sheet 125 may include at least one prism sheet and/or at least one diffusion sheet. A plurality of sheets included in the optical sheet 125 may be in a bonding state and/or a close contact state.

The optical sheet 125 may be formed with a plurality of sheets having different functions. For example, the optical sheet 125 may include first to three optical sheets 125*a* to 125*c*. The first optical sheet 125*a* may have a function of a diffusion sheet, and the second and third optical sheets 125*b* and 125*c* may have a function of a prism sheet. The number and/or a location of a diffusion sheet and a prism sheet may be changed. For example, the optical sheet 125 may include the first optical sheet 125*a*, which is a diffusion sheet and the second optical sheet 125*b*, which is a prism sheet.

The diffusion sheet prevents light emitted from the light guide plate 128 from partially concentrating, thereby more uniformly enabling luminance of light. The prism sheet concentrates light emitted from the diffusion sheet to enable light to be vertically applied to the display panel 110.

The coupler 125*d* may be formed in at least one of corners of the optical sheet 125. The coupler 125*d* may be formed in at least one of the first to third optical sheets 125*a* to 125*c*.

The coupler 125*d* may be formed at a corner of the long side of the optical sheet 125. The coupler 125*d* formed at the first long side and the coupler 125*d* formed at the second long side may be asymmetric. For example, a location and/or the number of the coupler 125*d* of the first long side and the coupler 125*d* of the second long side may be different.

Figure 8:
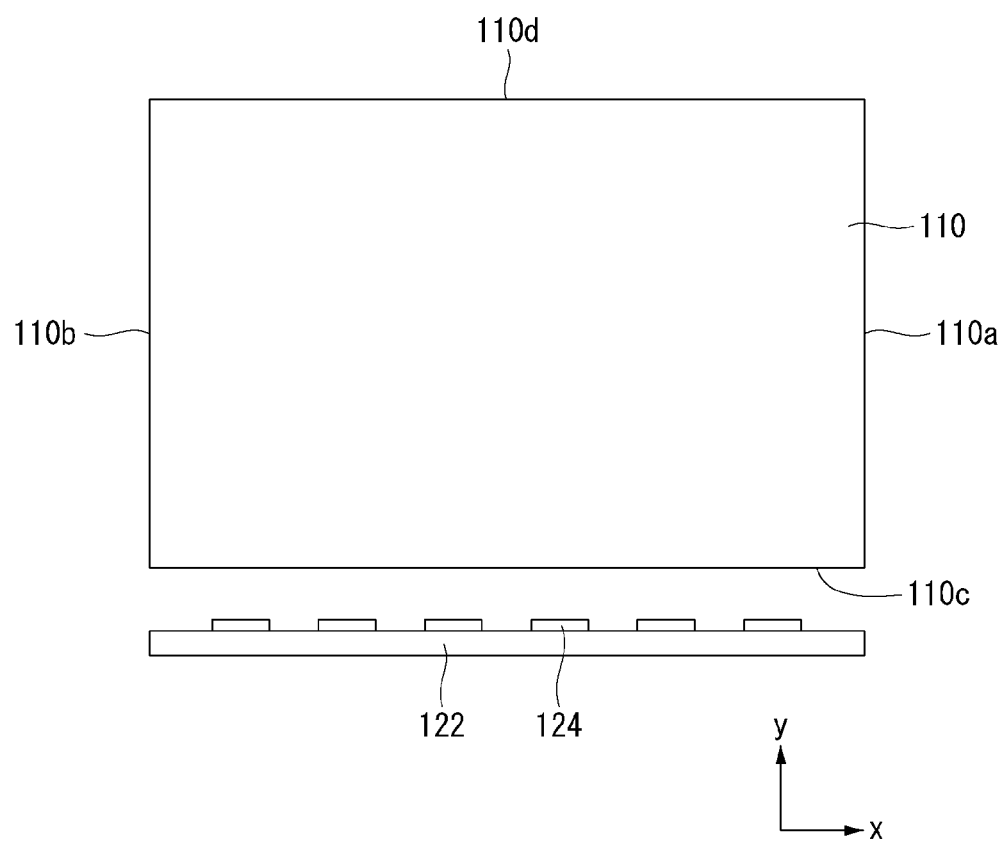
Figure 9:
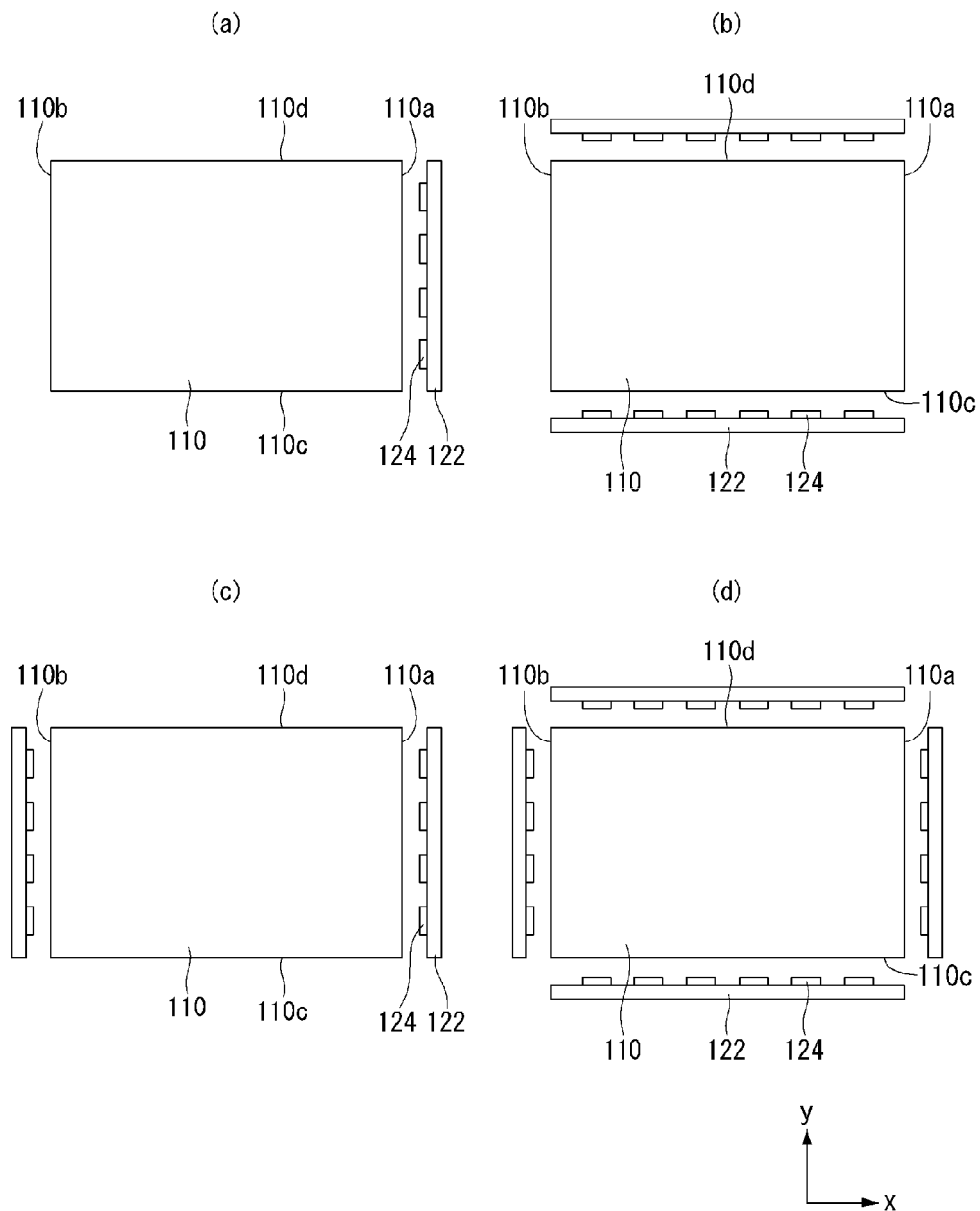

Referring to FIGS. 8 and 9, the substrate 122 and the light assembly 124 may be located in a direction of a lower side surface 110*c* of the display panel 110. A backlight unit in which the light assembly 124 is disposed at a side surface of the display panel 110 may be referred to as an edge type backlight unit.

As shown in FIG. 8, the light assembly 124 may emit light in a direction of an upper side surface 110*d* from the lower side surface 110*c* of the display panel 110. That is, light emitted from the light assembly 124 is diffused from the lower side surface 110*c* of the display panel 110 to the upper side surface 110*d* thereof to emit the entire display panel 110. However, a light emitting location of the light assembly 124 is not limited thereto and the light assembly 124 may be located at the upper side surface 110*d* of the display panel 110.

As shown in FIG. 9A, the light assembly 124 may be located at a right side surface 110*a* of the display panel 110. However, a location of the light assembly 124 is not limited thereto and the light assembly 124 may be located at a left side surface 110*b* of the display panel 110.

As shown in FIG. 9B, the light assembly 124 may be located at a lower side surface 110*c* and an upper side surface 110*d* of the display panel 110. As shown in FIG. 9C, the light assembly 124 may be located at the right side surface 110*a* and the left side surface 110*b* of the display panel 110.

As shown in FIGS. 9B and 9C, a backlight unit in which the light assemblies 124 are disposed at opposite both sides of the display panel 110 is referred to as a dual type backlight. The dual type backlight unit may enable light to be easily diffused to a front surface of the display panel 110 even to weaker light.

As shown in FIG. 9D, the light assembly 124 may be located at a front surface of the display panel 110. When the light assembly 124 is located at a front surface of the display panel 110, the dual type backlight unit may diffuse light more easily than other backlight units.

Figure 10:
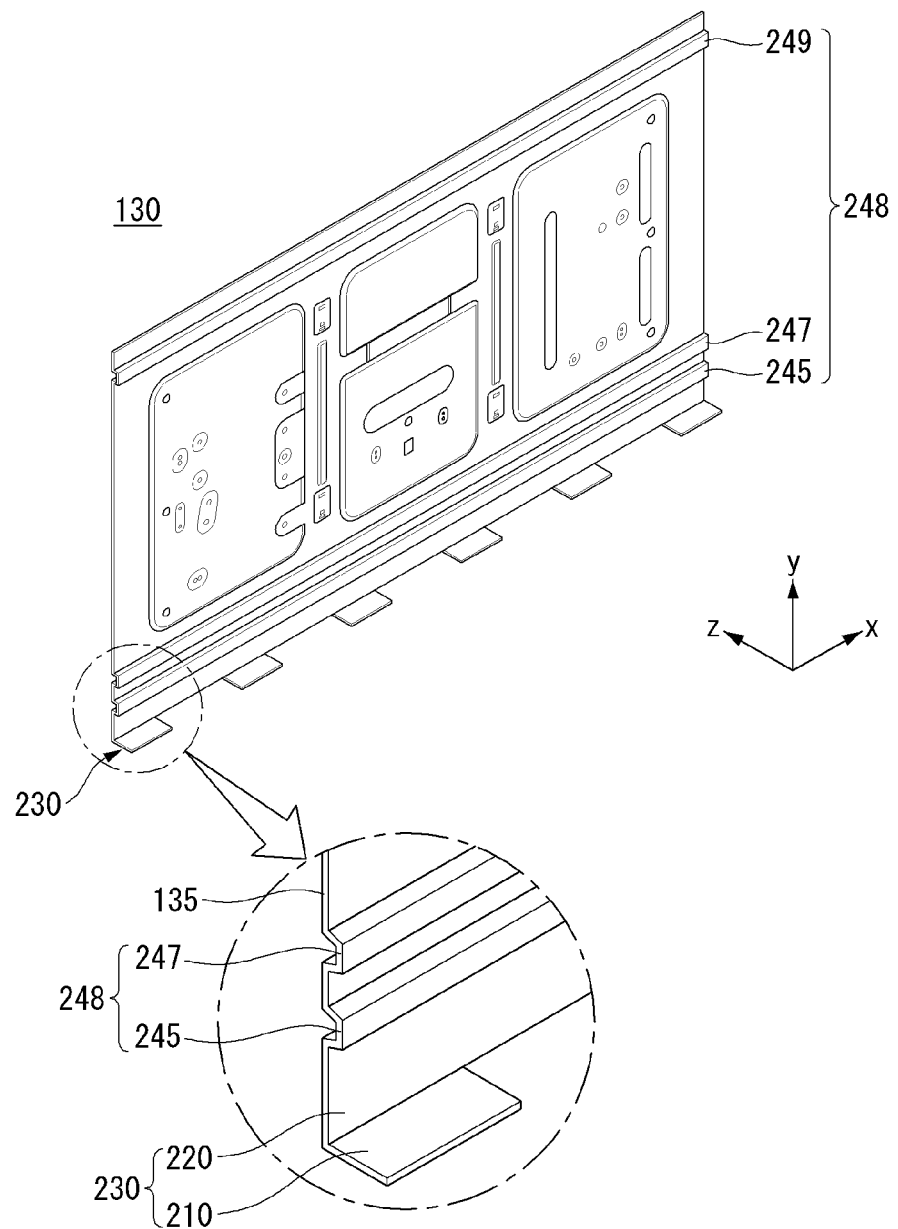
Figure 12:
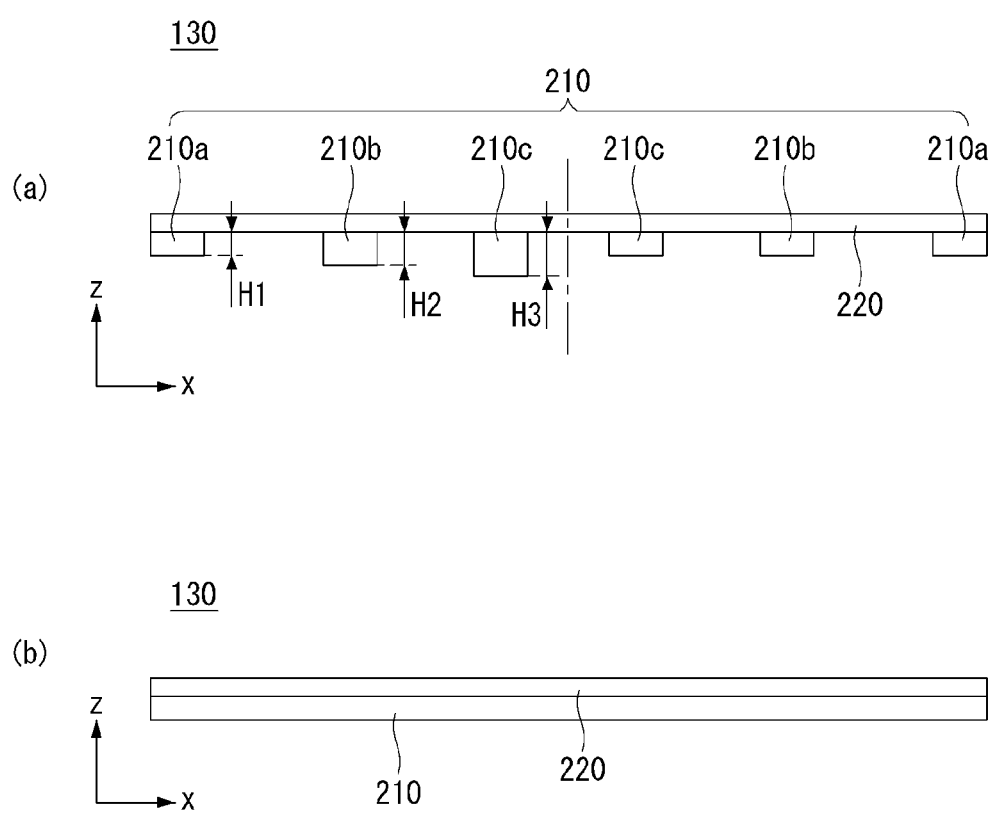

FIGS. 10 to 12 are views illustrating a flange according to an exemplary embodiment of the present disclosure.

As shown in FIGS. 10 to 12, in at least one corner of the bottom cover 130 according to an exemplary embodiment of the present disclosure, a light arriving portion 230 may be provided.

As shown in FIG. 10, the bottom cover 130 may support an internal configuration of the display device 100. For example, as described above, a configuration such as the backlight unit 120 may be coupled to the bottom cover 130.

The bottom cover 130 may be made of a metal material. For example, the bottom cover 130 may be made of aluminum alloy that can provide rigidity of a predetermined level or more while having a relatively light weight. In the bottom cover 130, various structures that can couple an internal configuration of the display device 100 may be added. For example, in the bottom cover 130, a forming portion 248 and a light arriving portion 230 may be provided.

The forming portion 248 may be an area in which at least a partial area of the bottom cover 130 is protruded to the front side. The forming portion may also be referred to as a ribbed portion, a protruding portion, or the like. For example, the forming portion 248 may be protrusions and depressions formed in at least a portion of a plate area 135 of the bottom cover 130 by a press processing.

The forming portion 248 may perform a function of supporting the optical layer 123 received at an entire surface of a front surface of the bottom cover 130. The forming portion 248 may include first to three forming portions 245, 247, and 249. The first to three forming portions 245, 247, and 249 may be formed in parallel in a horizontal direction and/or a vertical direction of the bottom cover 130. Therefore, the optical layer 123 is supported by the first to three forming portions 245, 247, and 249 to enable a phenomenon such as a twist not to occur. That is, the first to three forming portions 245, 247, and 249 may stably support the optical layer 123 by a surface contact with the optical layer 123 at a plurality of points.

The light arriving portion 230 may be formed in at least one corner area of the bottom cover 130. The light arriving portion 230 may also be referred to as a mounting portion or receiving portion for the backlight unit and/or light assembly and substrate. The light arriving portion 230 may include an arriving surface 220 (or planar surface) extended from the plate area 135 (or planar area) of the bottom cover 130 and a flange 210 in which the arriving surface 220 is extended and bent.

As shown in FIGS. 11 and 12, the flange 210 may be formed in various forms.

As shown in FIG. 11A, a plurality of flanges 210 are separated along a corner of the bottom cover 130 to be formed in a pair. For example, first to three flanges 210a to 210c may be separated by a constant distance.

Distances between at least two of the first to three flanges 210a to 210c may be different. At least one of D3, which is a distance from a central point of a corner of the bottom cover 130 in which the flange 210 is formed to the first flange 210a, D2, which is a distance from a central point of a corner of the bottom cover 130 in which the flange 210 is formed to the second flange 210b, and D1, which is a distance from a central point of a corner of the bottom cover 130 in which the flange 210 is formed to the third flange 210c may be different. For example, D1 may be smaller than D2 and/or D3. That is, at least a pair of the flange 210 is located adjacent to a central point to prevent the center of the substrate 122 coupled to the light arriving portion 230 from being drooped.

The first flange 210a may be located at the outermost of a corner of both sides of the bottom cover 130. Due to the first flange 210a located at the outermost of the bottom cover 130, both ends of the substrate 122 coupled to the light arriving portion 230 can be prevented from being drooped.

As shown in FIG. 11B, at least one of the flanges 210 may have a width different from that of at least another thereof. For example, a width W1 of the first flange 210a may be larger than a width W2 of the second flange 210b and/or a width W3 of the third flange 210c. Therefore, both ends of the substrate 122 coupled to the light arriving portion 230 can be effectively prevented from being drooped.

As shown in FIG. 12A, at least one of the flanges 210 may be different from that of at least another thereof. For example, a height H1 of the first flange 210a may be larger than a height H2 of the second flange 210b and/or a height H3 of the third flange 210c. Such a form may be applied when an edge area has a thickness smaller than that of a central partial area in a design.

As shown in FIG. 12B, one flange 210 may be continuously formed. That is, at the entire arriving surface 220 of the bottom cover 130, the flange 210 may be extended.

FIGS. 13 to 21 are views illustrating a substrate according to an exemplary embodiment of the present disclosure.

As shown in FIGS. 13 to 21, the substrate 122 according to an exemplary embodiment of the present disclosure may include a first surface 122a in which a light source 124 is mounted and a second surface 122b bent from the first surface 122a. The substrate 122 may be formed in at least one of a PCB, a Flexible Printed Circuit Board (FPCB), and a Multilayer Printed Circuit Board (MPCB).

As shown in FIG. 13A, at the first surface 122a, the light assembly 124 may be disposed. A plurality of light assemblies 124 may be disposed in parallel in a length direction of the first surface 122a. The light assembly 124 may include a light source and a lens located in an upper portion of the light source.

The second surface 122b may be a portion in which the first surface 122a is extended. The second surface 122b may be a portion in which the first surface 122a is bent. The second surface 122b may be substantially orthogonally bent from the first surface 122a. At the second surface 122b, a plurality of leads WI extended from the first surface 122a may be disposed. The plurality of leads WI may be extended to a connector area 122c.

The connector area 122c may be located in at least one point of a corner of the second surface 122b. The connector area 122c may be a passage that connects the light assembly 124 of the first surface 122a to the outside. That is, a power source and/or a control signal necessary for operation of the light assembly 124 may be received from a controller and/or a power source of the display device 100 through the connector area 122c.

As the connector area 122c is located at the second surface 122b, the display device 100 may be designed to have a small thickness. This may be clearly understood in consideration that there is a limitation in reducing a thickness of a Z-direction due to a space necessary for the connector area 122c in a conventional plate-shaped substrate. The connector area 122c according to an exemplary embodiment of the present disclosure locates the connector area 122c at the second surface 122b unrelated to a thickness of the display device 100, thereby enhancing the degree of freedom of a design.

In the connector area 122c, a lead WI disposed at the second surface 122b may be concentrated. The connector area 122c may be coupled to the bottom cover 130. The connector area 122c may be coupled to the bottom cover 130, and the lead WI may be connected to the display device 100. The connector area 122c may be coupled to the bottom cover 130, and the substrate 122 may be fixed to the bottom cover 130.

As shown in FIG. 13B, a width of the first surface 122a of the substrate 122 may be W5, and a length of the second surface 122b may be H5. The width W5 may be similar to a width L of the light assembly 124 mounted in the first surface 122a. For example, the width W5 may be the same as or a little larger than the width L.

The light assembly 124 mounted in the first surface 122a may be moved in a Z-direction, compared with a conventional case. For example, the light assembly 124 may close contact with the second surface 122b side. Because the lead WI may be moved to the second surface 122b unlike a conventional case, a location of the light assembly 124 may be changed. That is, in a conventional substrate having a flat plate form, due to a space necessary for a disposition of a lead connected to the light assembly 124, there is a limitation in a location design of the light assembly 124. However, in the substrate 122 according to an exemplary embodiment of the present disclosure, at least a portion of the lead WI may be moved to the second surface 122b. Therefore, a width of a Z-direction of the substrate 122 can be reduced and the degree of freedom of a location design of the light assembly 124 of the first surface 122a can be secured.

The substrate 122 may be a small width W5, compared with when the substrate 122 is not formed with the first and second surfaces 122a and 122b. That is, in a conventional flat plate form, due to a disposition space of the lead WI and/or the connector area 122c, there is a limitation in reducing a size of the width W5. However, in the substrate 122 according to an exemplary embodiment of the present disclosure, by disposing the lead WI at the bent second surface 122b, the width W5 can be minimized. Therefore, the width W5 may be reduced to the same size as or to a size a little larger than the width L and thus a thickness of a Z-direction of the display device 100 can be reduced.

Figure 14:
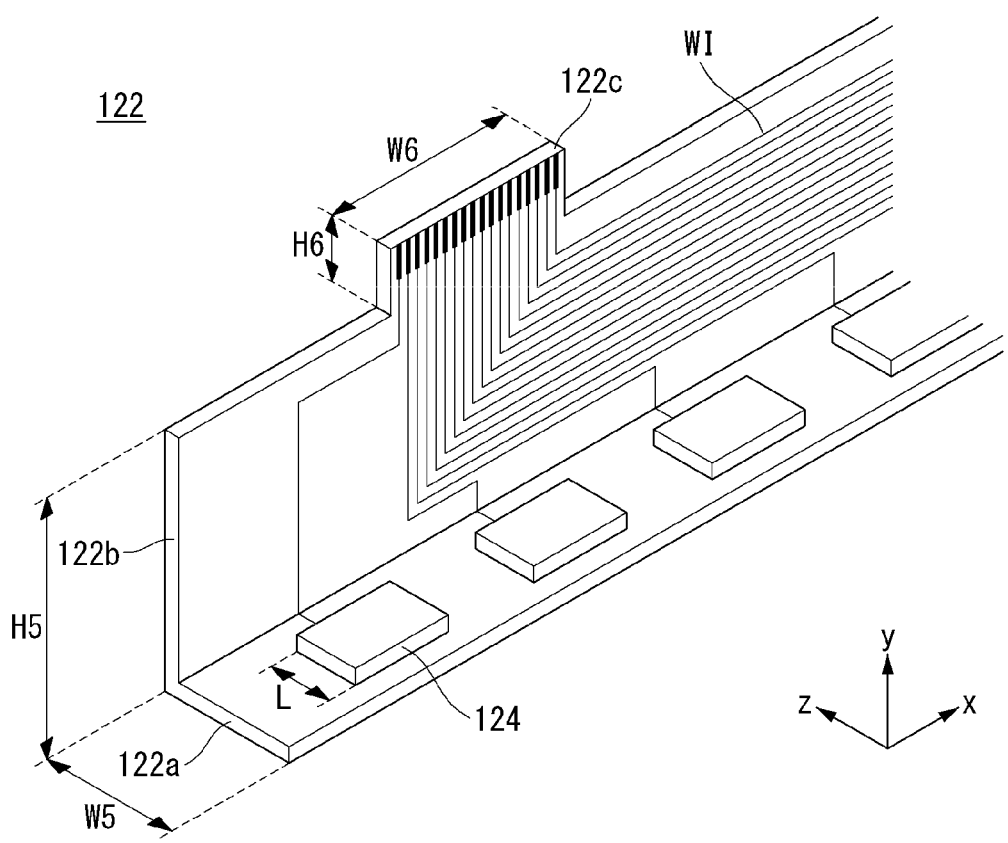

As shown in FIG. 14, the lead WI may be connected from the respective light assemblies 124 to the connector area 122c.

A width W6 and a height H6 of the connector area 122c may be determined according to the number of the lead WI concentrated to the connector area 122c. For example, the width W6 may increase according to a width of the lead WI and/or a distance between the leads WI. Therefore, the width W6 may increase in proportional to a size of the display device 100.

The width W6 and/or the height H6 of the connector area 122c may be determined according to a bonding force necessary for coupling between the substrate 122 and the bottom cover 130. For example, when a larger fastening force is required, a size of the connector area 122c may be increased.

Figure 15:
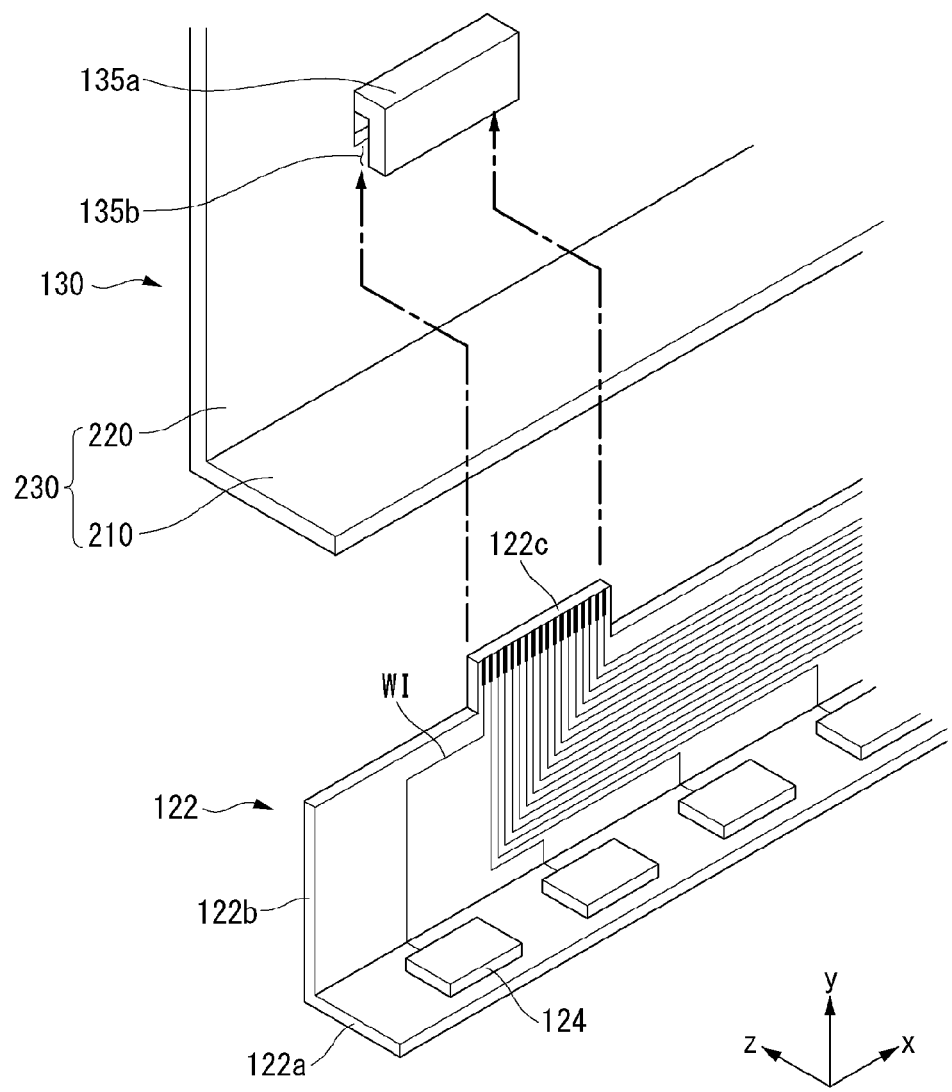
Figure 16:
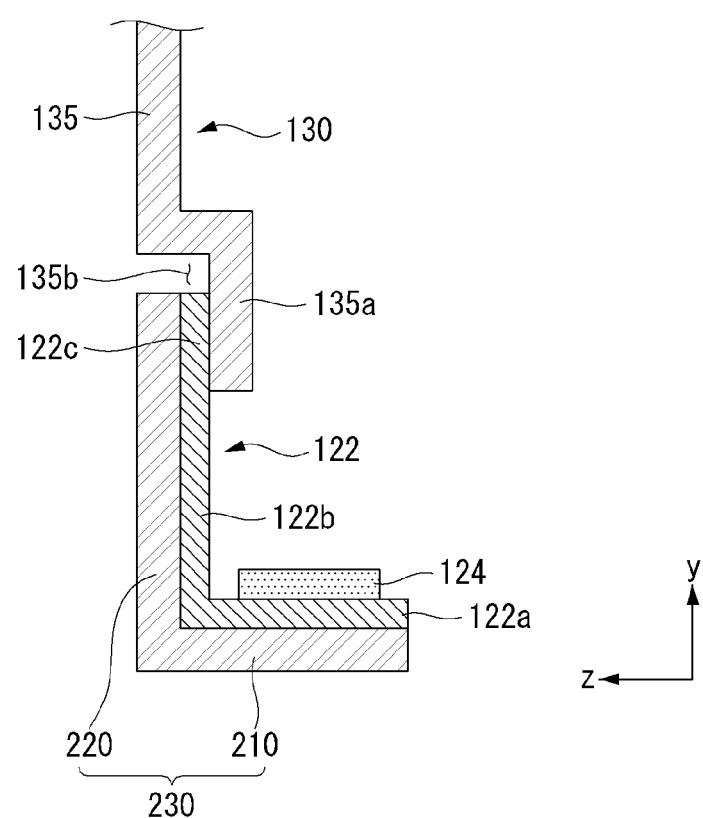

As shown in FIGS. 15 and 16, the connector area 122c may be inserted into the coupler 135a formed in the bottom cover 130.

The coupler 135a may have a form in which a partial area of the bottom cover 130 is cut out. For example, a partial area of the bottom cover 130 may be in a state protruded in −Z-direction by a press processing. The coupler 135a may include an opening 135b formed in −Y-direction. A size of the opening 135b may be fixed in a state in which the substrate 122 is coupled to correspond to a size of the connector area 122c.

Figure 17:
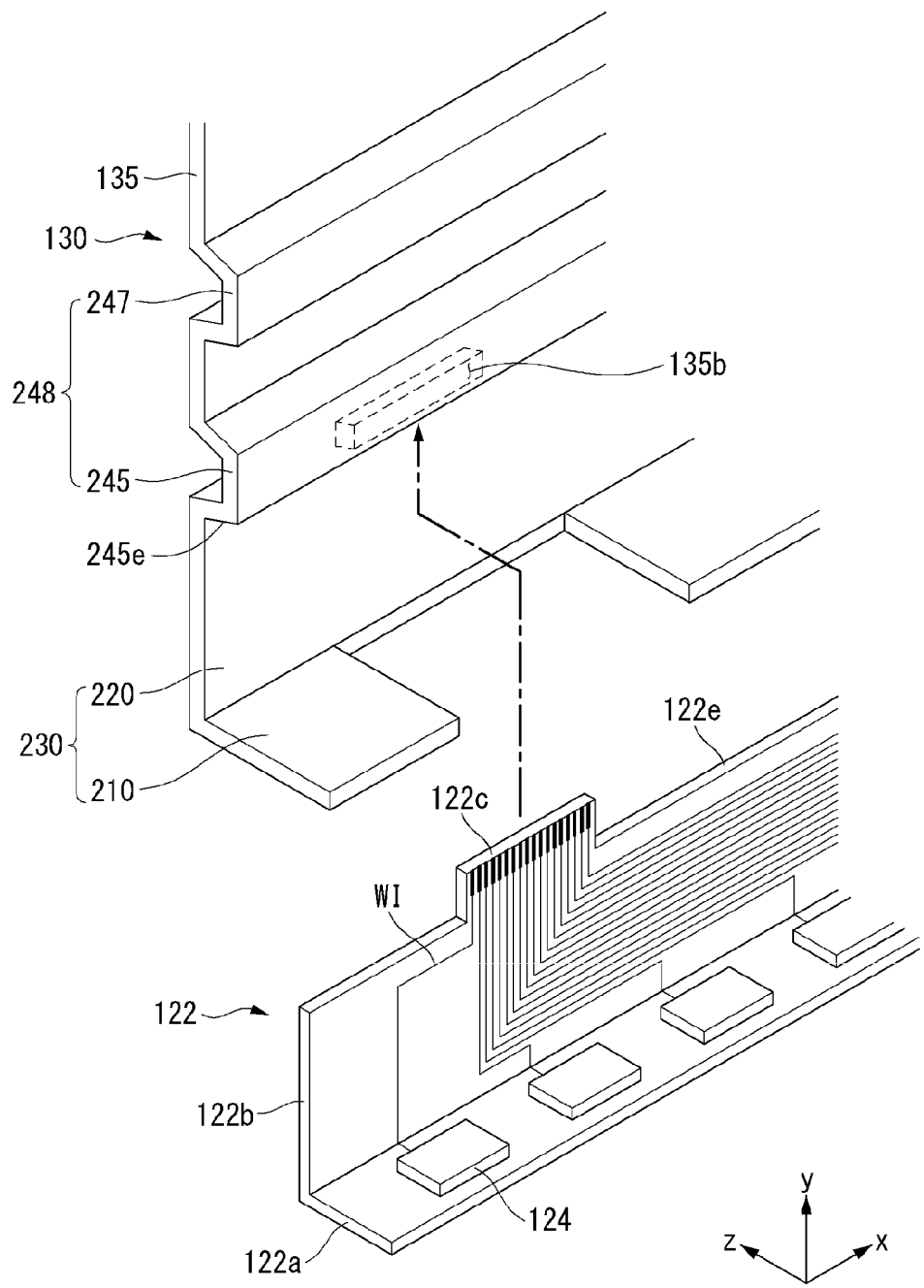
Figure 18:
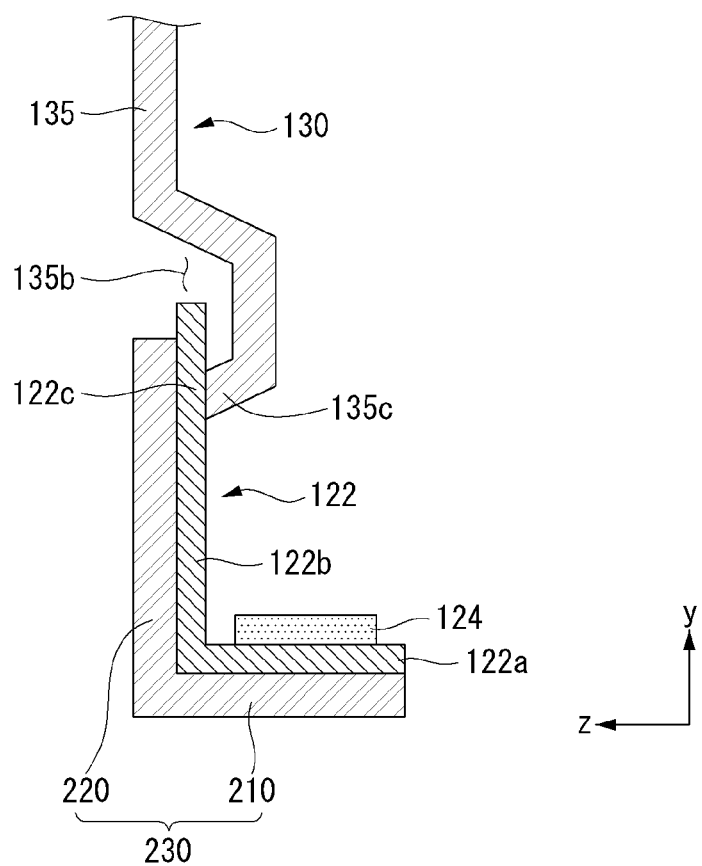

As shown in FIGS. 17 and 18, the opening 135b may be formed in the forming portion 248. For example, the opening 135b may be formed on the first forming portion 245 located at the lowermost of the bottom cover 130.

The opening 135b may be located between the first forming portion 245 and the plate area 135 of the bottom cover 130. In the opening 135b, a protruding portion 135c extended in a direction of the coupled connector area 122c may be formed.

Figure 19:
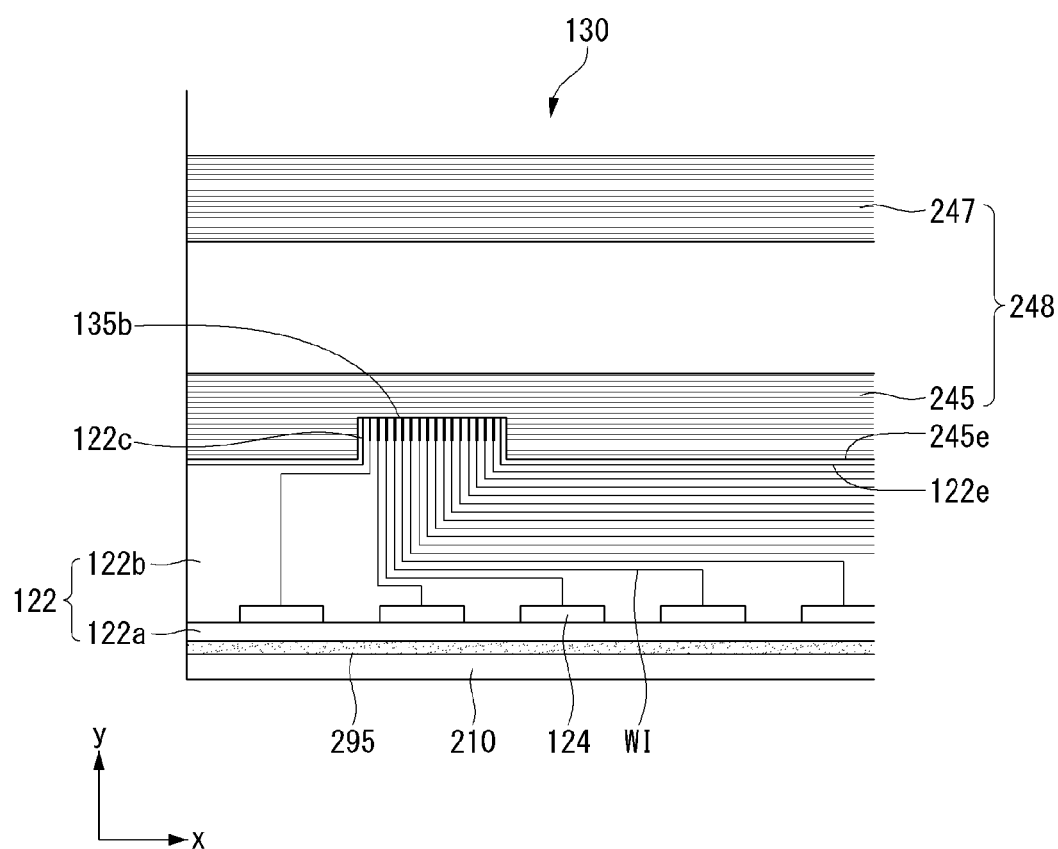

As shown in FIG. 19, a lower end surface 245e of the first forming portion 245 may contact an upper end surface 122e of the substrate 122.

When the connector area 122c is coupled to the opening 135b, the upper end surface 122e may naturally contact the lower end surface 245e. Therefore, by the lower end surface 245e, the substrate 122 may be guided to the arriving surface 220.

The substrate 122 may be coupled to the light arriving portion 230 with a bonding method. For example, an adhesive layer 295 may be located between the flange 210 of the light arriving portion 230 and the first surface 122a of the substrate 122. The adhesive layer 295 may be, for example, a double-sided tape. Therefore, the first surface 122a and the flange 210 may be fixed by a bonding force between the connector area 122c and the opening 135b and a bonding force by the adhesive layer 295.

Figure 21:
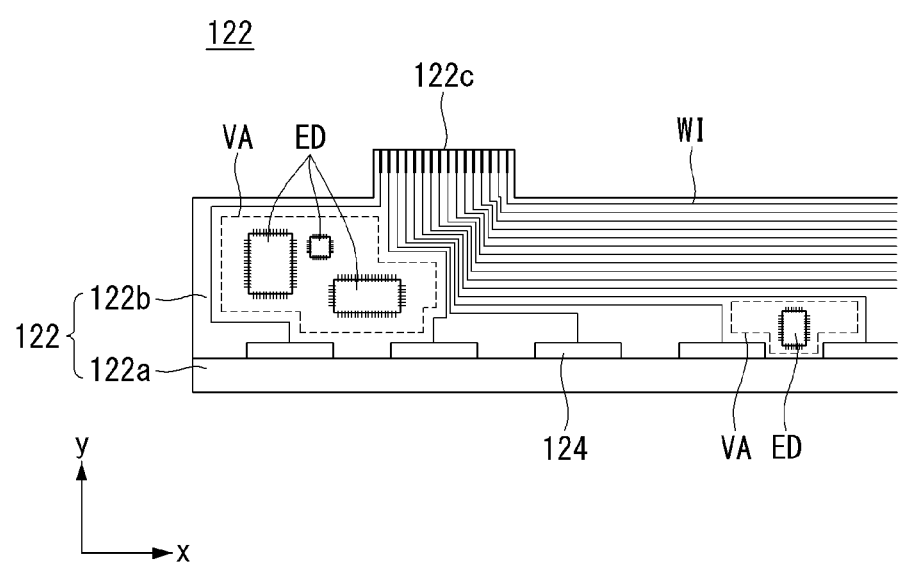

FIGS. 20 and 21 illustrate a form of the connector area 122c according to various exemplary embodiments of the present disclosure.

As shown in FIG. 20A, the connector area 122c may be located at one side of a corner of the substrate 122.

As shown in FIG. 20B, a plurality of connector areas 122c may exist. For example, the connector area 122c may include a first connector area 122ca located at one side of a corner of the substrate 122 and a second connector area 122cb located at the other side thereof.

The first connector area 122ca may correspond to a first light assembly group LG1, and the second connector area 122cb may correspond to a second light assembly group LG2. When a plurality of connector areas 122c are used, a distance of the lead WI between each light assembly 124 and the connector area 122c may be shortened. Therefore, due to the lead WI concentrated toward one connector area 122c, a phenomenon that a size of the second surface 122b increases may be prevented.

As shown in FIG. 21, at the second surface 122b, an electronic component ED may be mounted. For example, in an empty area VA other than space provided for the lead WI, an electronic element ED necessary for operation of the light assembly 124 may be disposed. Therefore, while having no influence on a thickness of the display device 100, a necessary function can be effectively implemented.

Figure 22:
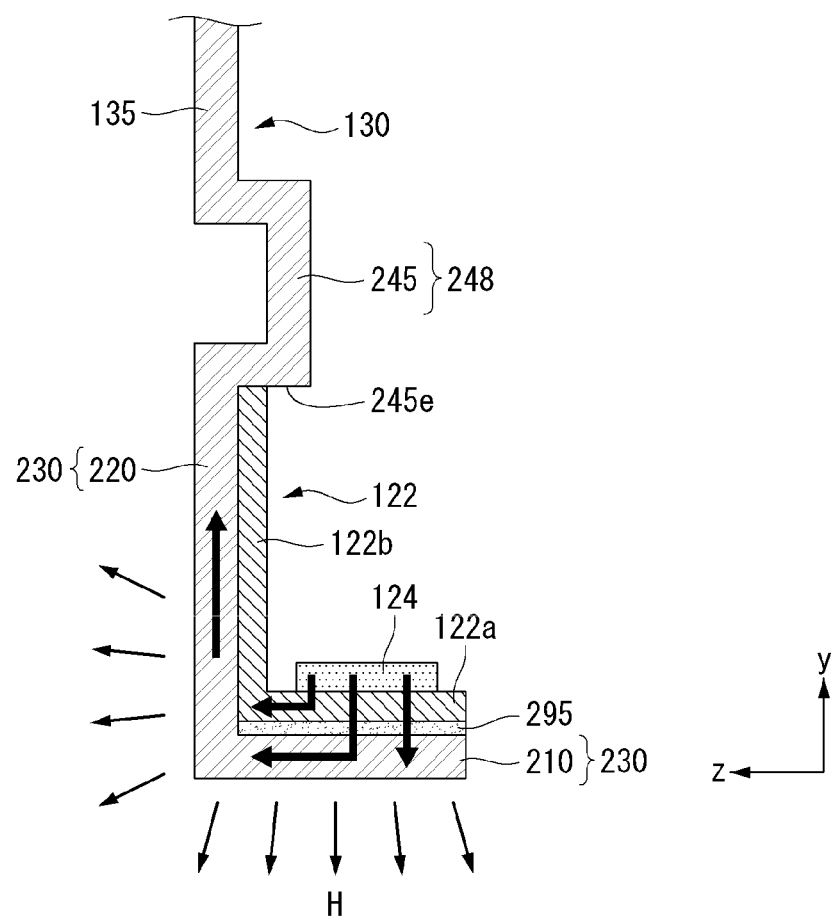
FIGS. 22 and 23 are views illustrating a heat releasing process of a substrate according to an exemplary embodiment of the present disclosure.
Figure 23:
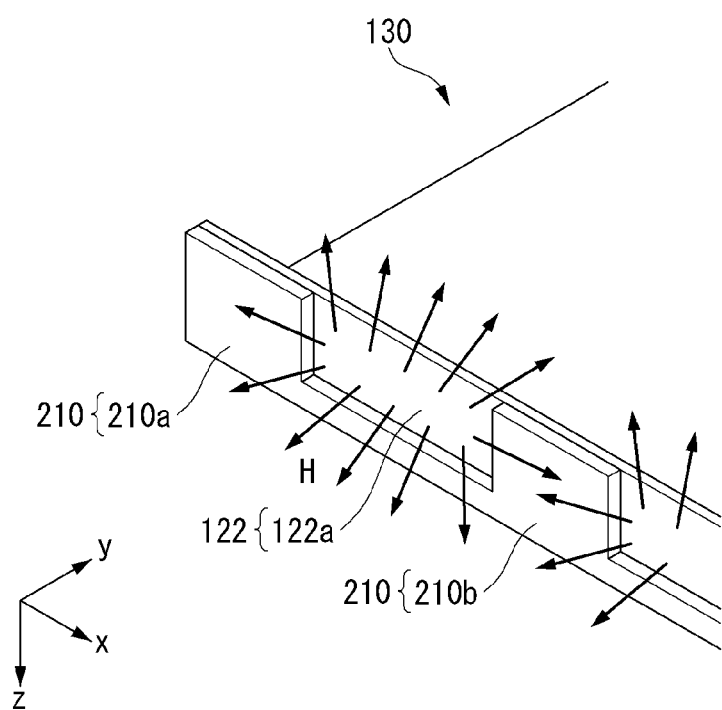

FIGS. 22 and 23 are views illustrating a heat releasing process of a substrate according to an exemplary embodiment of the present disclosure.

As shown in FIGS. 22 and 23, the substrate 122 according to an exemplary embodiment of the present disclosure can more effectively release a heat that has occurred while operation of the light assembly 124.

As shown in FIG. 22, in the light assembly 124, a heat may occur. When a heat is accumulated in the light assembly 124, the accumulated heat may have an influence on operation of the light assembly 124. Therefore, it is necessary to transfer a heat of the light assembly 124 to the bottom cover 130 made of a material having relatively high thermal conductivity. Due to bending of the substrate 122, the substrate 122 according to an exemplary embodiment of the present disclosure may be coupled to the bottom cover 130. Thereby, a conventional housing structure necessary for coupling the substrate 122 to the bottom cover 130 may be omitted. Therefore, a heat of the substrate 122 may be more quickly and effectively conducted to the bottom cover 130 side.

As shown in FIG. 23, the flange 210 may be divided into a plurality of areas. For example, mutually separated first and second flanges 210a and 210b may exist. The first surface 122a of the substrate 122 may be exposed between the separated first and second flanges 210a and 210b. Therefore, a heat may be easily released to air through the exposed first surface 122a.

FIGS. 24 to 46 are views illustrating a coupling structure according to an exemplary embodiment of the present disclosure.

As shown in FIGS. 24 to 46, the display device 100 according to an exemplary embodiment of the present disclosure may couple the substrate 122 to the bottom cover 130 with various methods.

Figure 24:
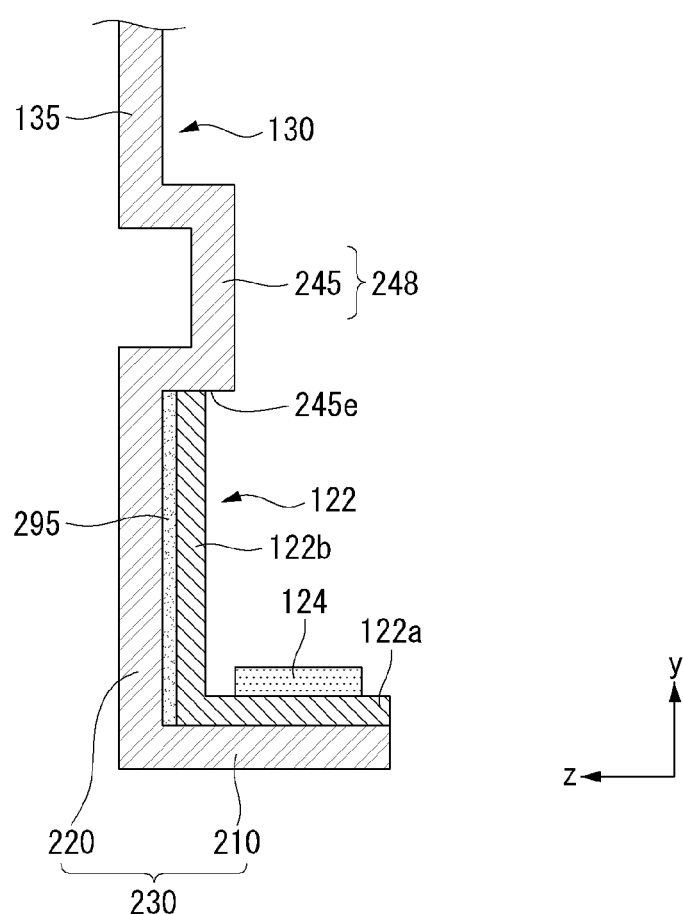

As shown in FIG. 24, the adhesive layer 295 may be located between the substrate 122 and the bottom cover 130. The adhesive layer 295 may be located between the second surface 122b of the substrate 122 and the arriving surface 220 of the bottom cover 130.

Figure 25:
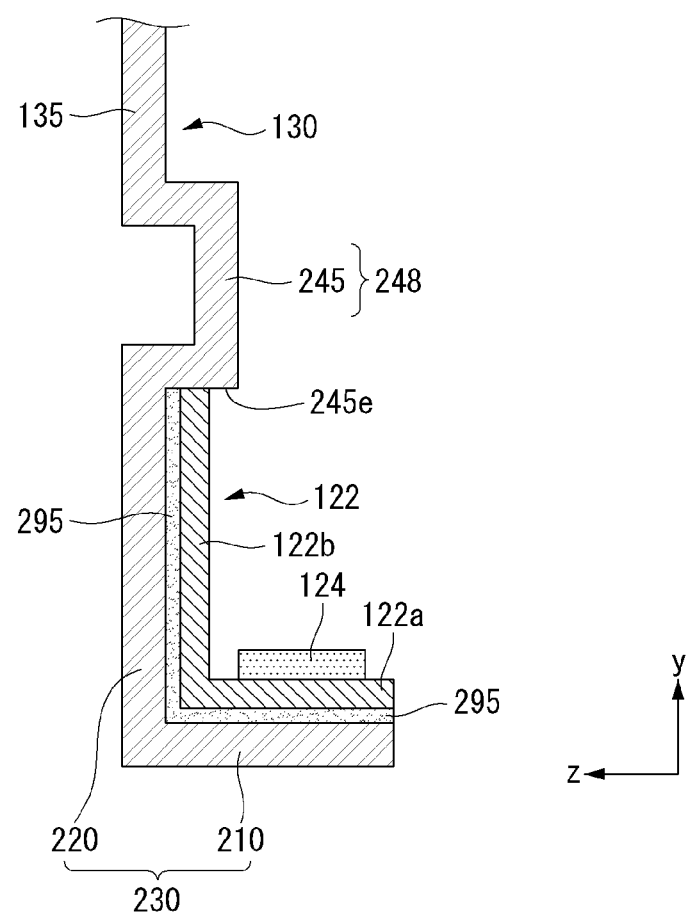

As shown in FIG. 25, the adhesive layer 295 may include first and second adhesive layers 295a and 295b. The first adhesive layer 295a may be located between the first surface 122a and the flange 210, and the second adhesive layer 295b may be located between the second surface 122b and the arriving surface 220.

Figure 26:
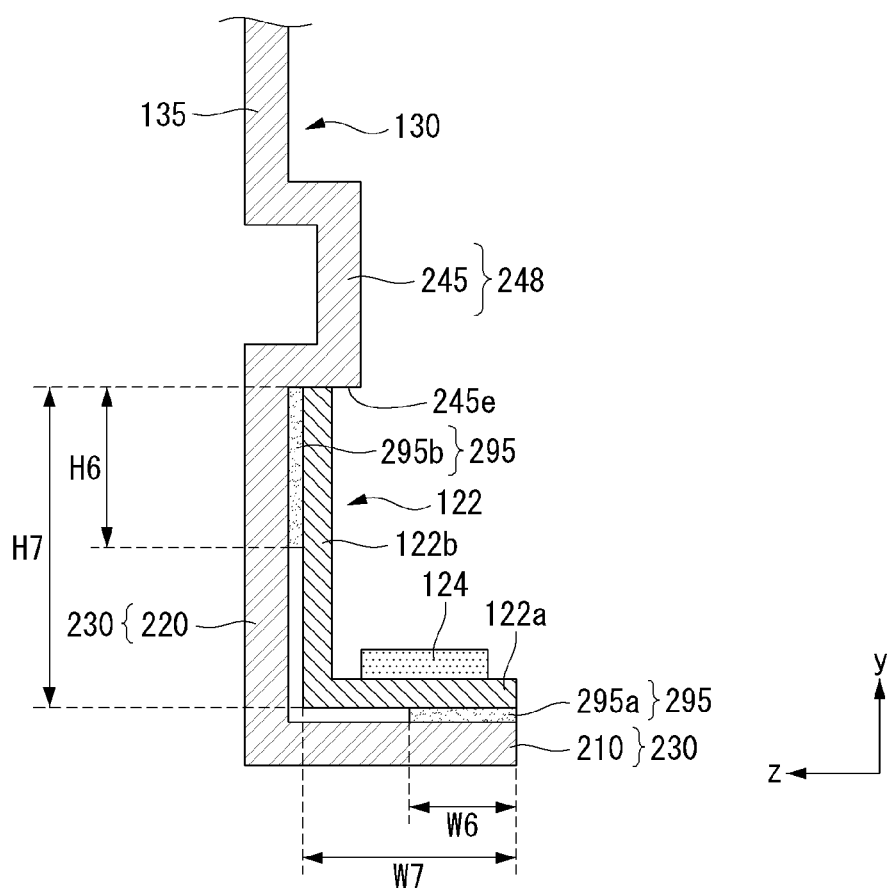

As shown in FIG. 26, the adhesive layer 295 may be located in a partial area. For example, when a length of the first adhesive layer 295a is W6 and a length of the second adhesive layer 295b is H6, a length W7 of the flange 210 and a length H7 of the arriving surface 220 may be larger than W6 and H6.

The adhesive layer 295 may be an area fusion-bonded by a heat. For example, the substrate 122 may be fixed to the bottom cover 130 using laser welding.

Figure 27:
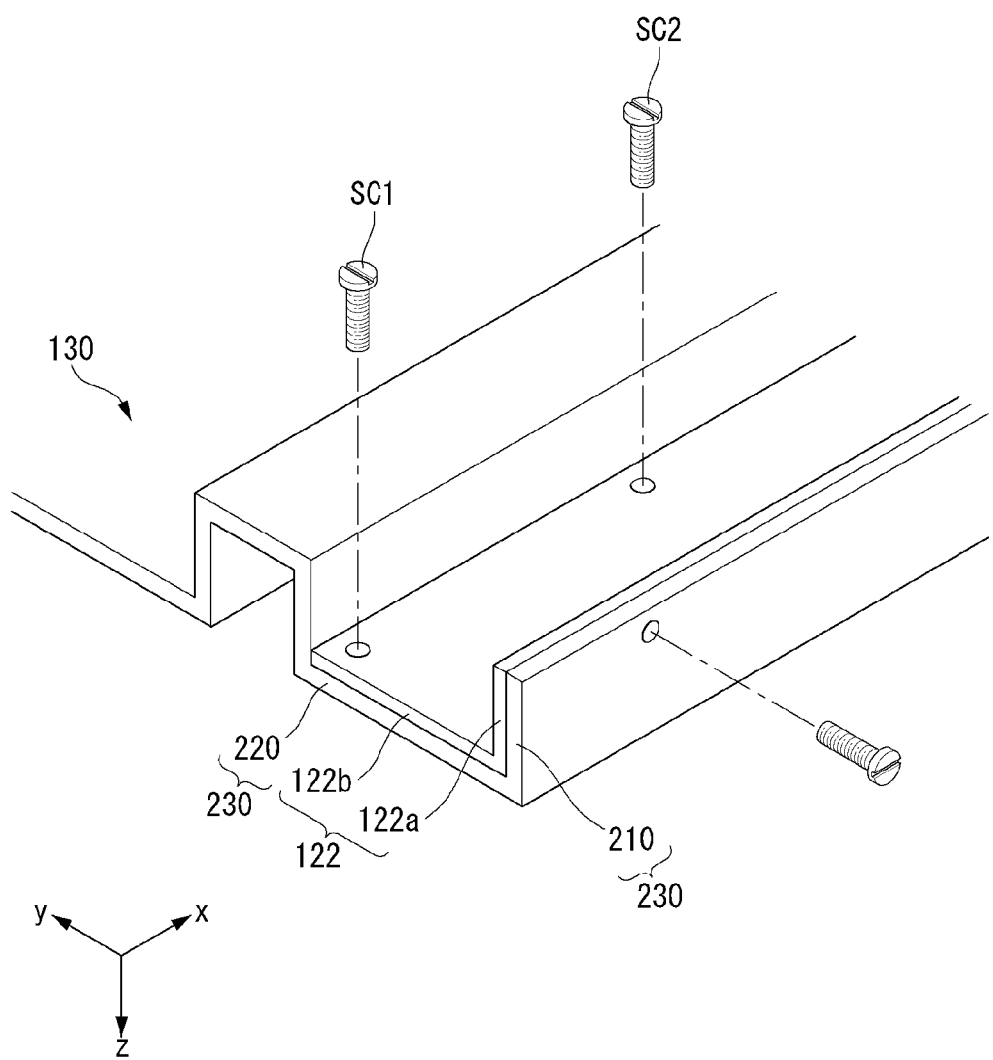

As shown in FIG. 27, the substrate 122 may be fixed to the bottom cover 130 using fastening members SC1 to SC3. The fastening members SC1 to SC3 may include first and second screws SC1 and SC2 coupling to the second surface 122b and the arriving surface 220 and/or the third screw SC3 coupling to the first surface 122a and the flange 210. When coupling using the fastening members SC1 to SC3, the substrate 122 may directly contact the bottom cover 130 and thus enhancement of a heat conduction characteristic may be expected.

As shown in FIG. 28A, in the bottom cover 130, the coupler 270 into which the substrate 122 is inserted may be formed.

The coupler 270 may be formed in at least a partial area of the bottom cover 130. The coupler 270 may include a first coupler 270a and a second coupler 270b. The first coupler 270a may be located in an upper portion of the arriving surface 220, and the second coupler 270b may be located in an end portion of the flange 210.

The first coupler 270a may be an opening formed in a portion of an upper portion of the arriving surface 220. The first coupler 270a may be provided in the first forming portion 245. A portion of an opening of the first coupler 270a may be shielded by the protruding portion 135c.

In the second coupler 270b, a portion of an end portion of the flange 210 may be bent. That is, an end portion of the flange 210 may be a recess formed by bending a plurality of times in the same direction.

As shown in FIG. 28B, the substrate 122 may be coupled to the bottom cover 130 by inserting into the coupler 270. That is, the first surface 122a may be inserted into the second coupler 270b, and the second surface 122b may be inserted into the first coupler 270a.

Figure 29:
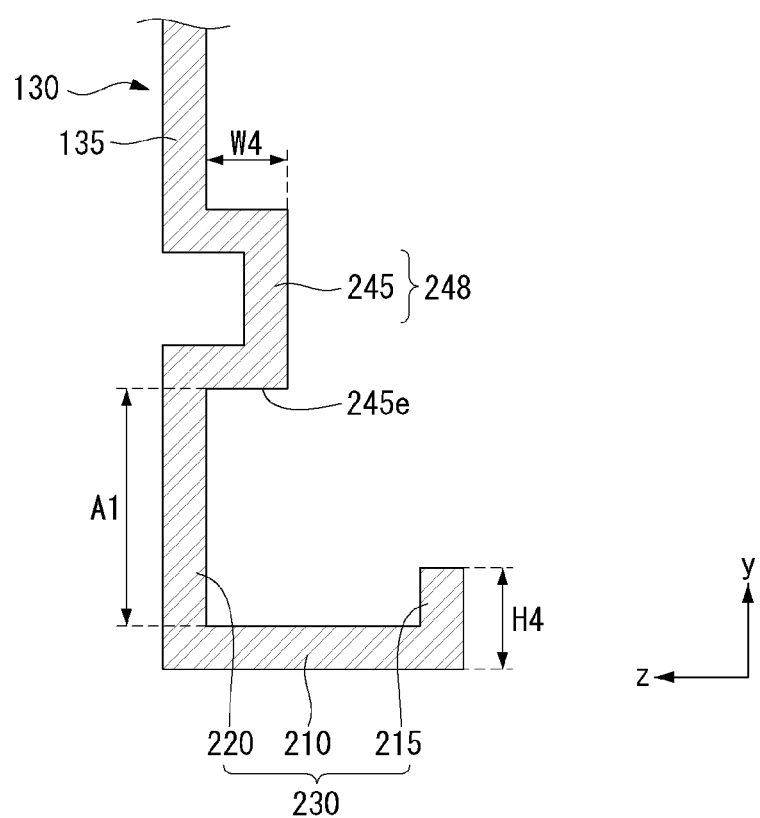
Figure 30:
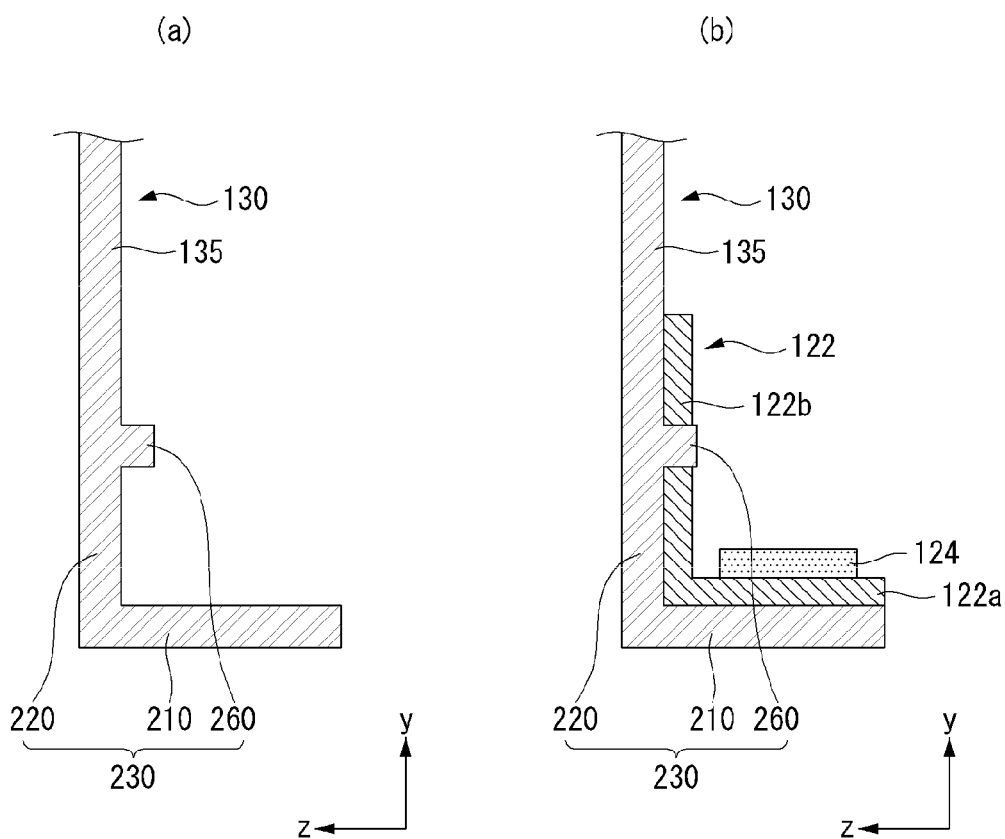

As shown in FIG. 29, in an end portion of the flange 210, a protruding portion 215 of a height H4 may be formed.

The protruding portion 215 may enable the substrate 122 received in the flange 210 not to move in −Z-direction. A lower end surface 245e of the first forming portion 245 may enable the substrate 122 received in the flange 210 not to move in a Y-direction. Therefore, when a length A1 of the arriving surface 220 and a length A2 of the flange 210 correspond to a size of the substrate 122, the substrate 122 may be securely coupled to the light arriving portion 230.

As shown in FIG. 30A, in the plate area 135 of the bottom cover 130, a coupling protrusion 260 may be protruded in −Z-direction.

As shown in FIG. 30B, the coupling protrusion 260 may be coupled to the substrate 122. For example, the coupling protrusion 260 may be inserted into a coupling hole formed in the second surface 122b.

As shown in FIG. 31A, in the plate area 135, a plurality of coupling protrusions 260 may be protruded. For example, in a state separated by a predetermined distance, a first coupling protrusion 260a may be protruded in a length W5 and a second coupling protrusion 260b may be protruded in a length W6. The second coupling protrusion 260b may be larger than the first coupling protrusion 260a.

As shown in FIG. 31B, the first coupling protrusion 260a may correspond to a height of the second surface 122b of the substrate 122. The second coupling protrusion 260b may be protruded in −Z-direction further than a height of the second surface 122b of the substrate 122.

Figure 32:
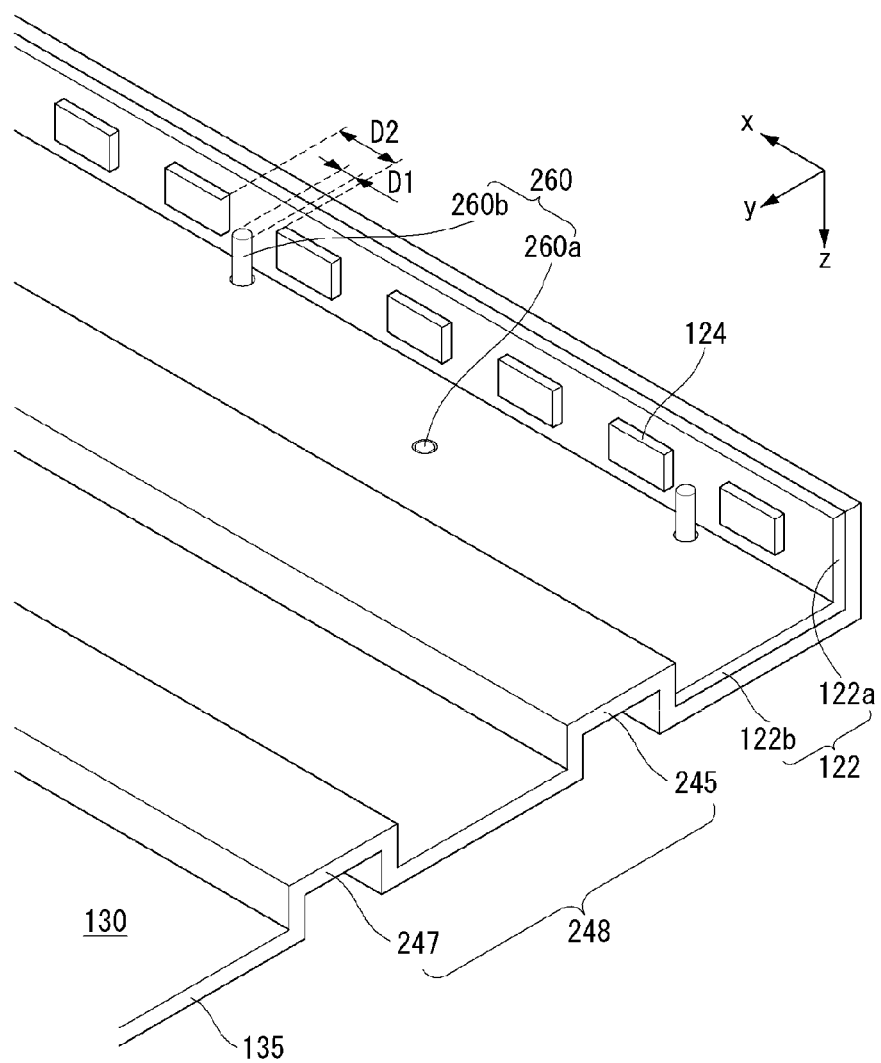

As shown in FIG. 32, the second coupling protrusion 260b may be protruded to the front side by passing through the second surface 122b.

The second coupling protrusion 260b may be located between the light assemblies 124. A width D1 of the second coupling protrusion 260b may be smaller than a width D2 between the light assemblies 124. Therefore, light emitted from the light assembly 124 may not be disturbed by the protruded second coupling protrusion 260b.

Figure 33:
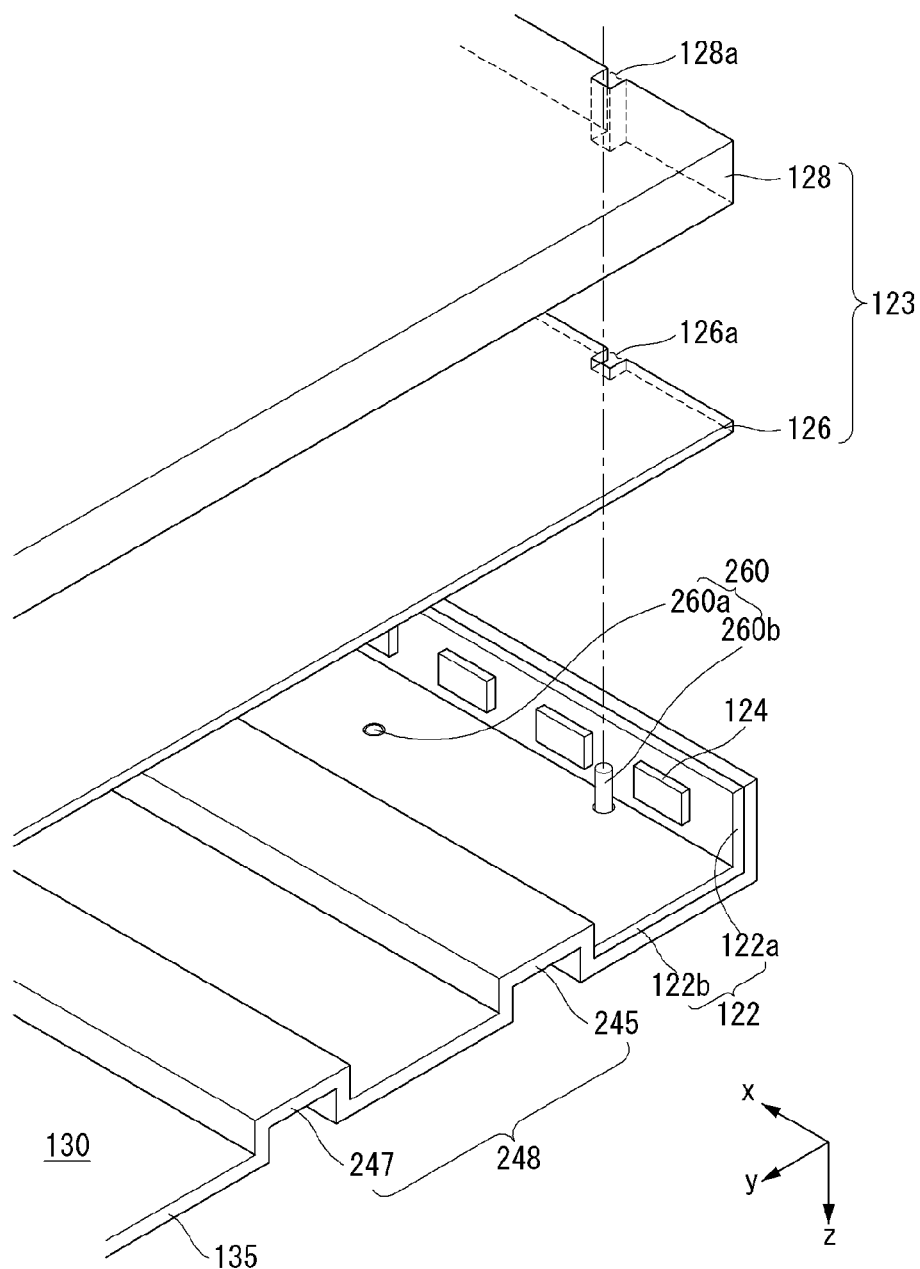

As shown in FIG. 33, in the reflection sheet 126 and/or the light guide plate 128, the first and second coupling holes 126a and 128a corresponding to the second coupling protrusion 260b may be formed. That is, in order to enable the second coupling protrusion 260b to be coupled and to enable to correspond to each second coupling protrusion 260b, the first and second coupling holes 126a and 128a may be located.

As the second coupling protrusion 260b is coupled to the optical layer 123, a location of the optical layer 123 may be fixed to an initial design location. For example, a distance between the optical layer 123 and the light assembly 124 may be fixed to a design location.

As shown in FIG. 34A, one side of the first and second coupling holes 126a and 128a may be opened at a corner of the reflection sheet 126 and the light guide plate 128.

As shown in FIG. 34B, the first and second coupling holes 126a and 128a may be formed in an area of the inside of the reflection sheet 126 and the light guide plate 128. For example, in the reflection sheet 126, the first coupling hole 126a is provided in a through-hole form, and in the light guide plate 128, the second coupling hole 128a may be formed in a depth smaller than a thickness of the light guide plate 128. That is, the second coupling protrusion 260b may not penetrate the light guide plate 128.

Figure 35:
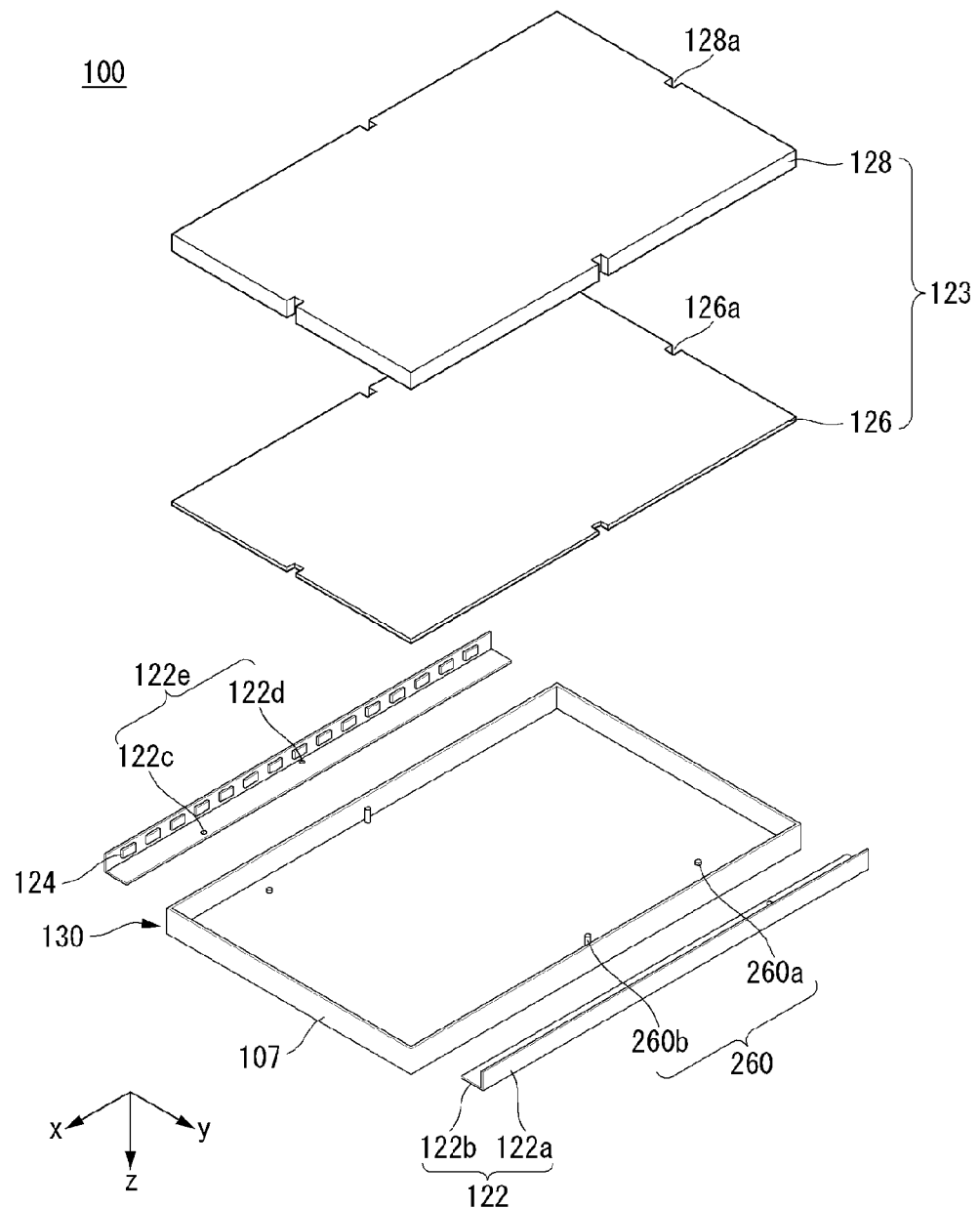

As shown in FIG. 35, the substrate 122 in which the light assembly 124 is mounted may be located at a corner of both sides of the display device 100. That is, two substrates 122 may be located at an opposite location. The coupling protrusion 260 may be located to correspond to each corner area of the bottom cover 130. For example, at each corner of the bottom cover 130, first and second coupling protrusions 260a and 260b may be each provided. In the reflection sheet 126 and the light guide plate 128, first and second coupling holes 126a and 128a corresponding to the second coupling protrusion 260b having a long length may be formed.

At a side surface of the bottom cover 130, a side cover 107 may be located. For example, the side cover 107 may have a form in which the bottom cover 130 is extended. For example, at least one corner of four corners of the bottom cover 130 is bent to form the side cover 107. In such a case, the side cover 107 may be formed integrally with the bottom cover 130 rather than a separate structure. Alternatively, the side cover 107 is formed separately from the bottom cover 130 to be coupled to the bottom cover 130.

Figure 36:
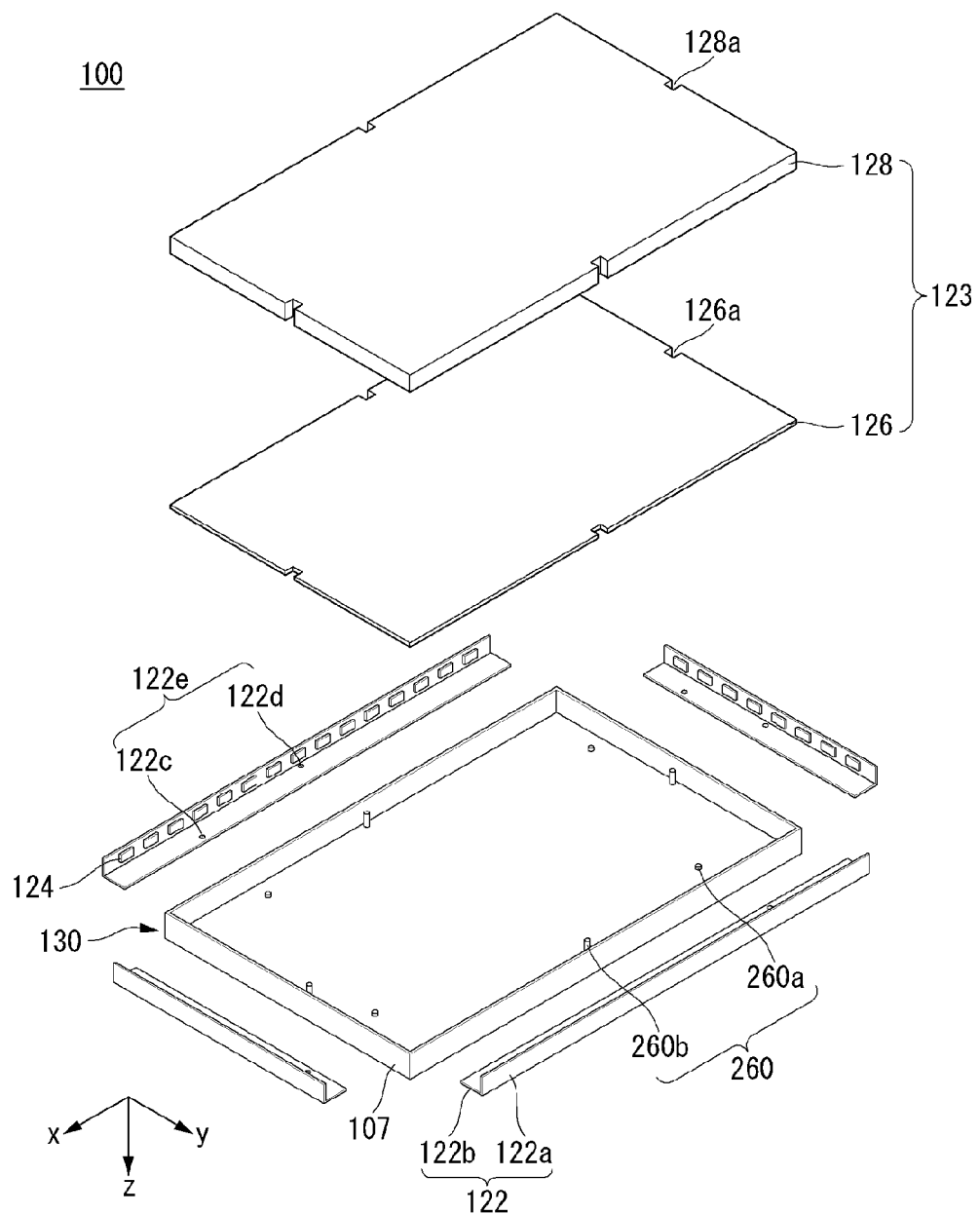

As shown in FIG. 36, the substrate 122 in which the light assembly 124 is mounted may be located at each corner of the display device 100. Accordingly, the coupling protrusion 260 may be located to correspond to each corner area of the bottom cover 130. In the reflection sheet 126 and the light guide plate 128, a first coupling hole 126a corresponding to the coupling protrusion 260b may be formed.

Figure 37:
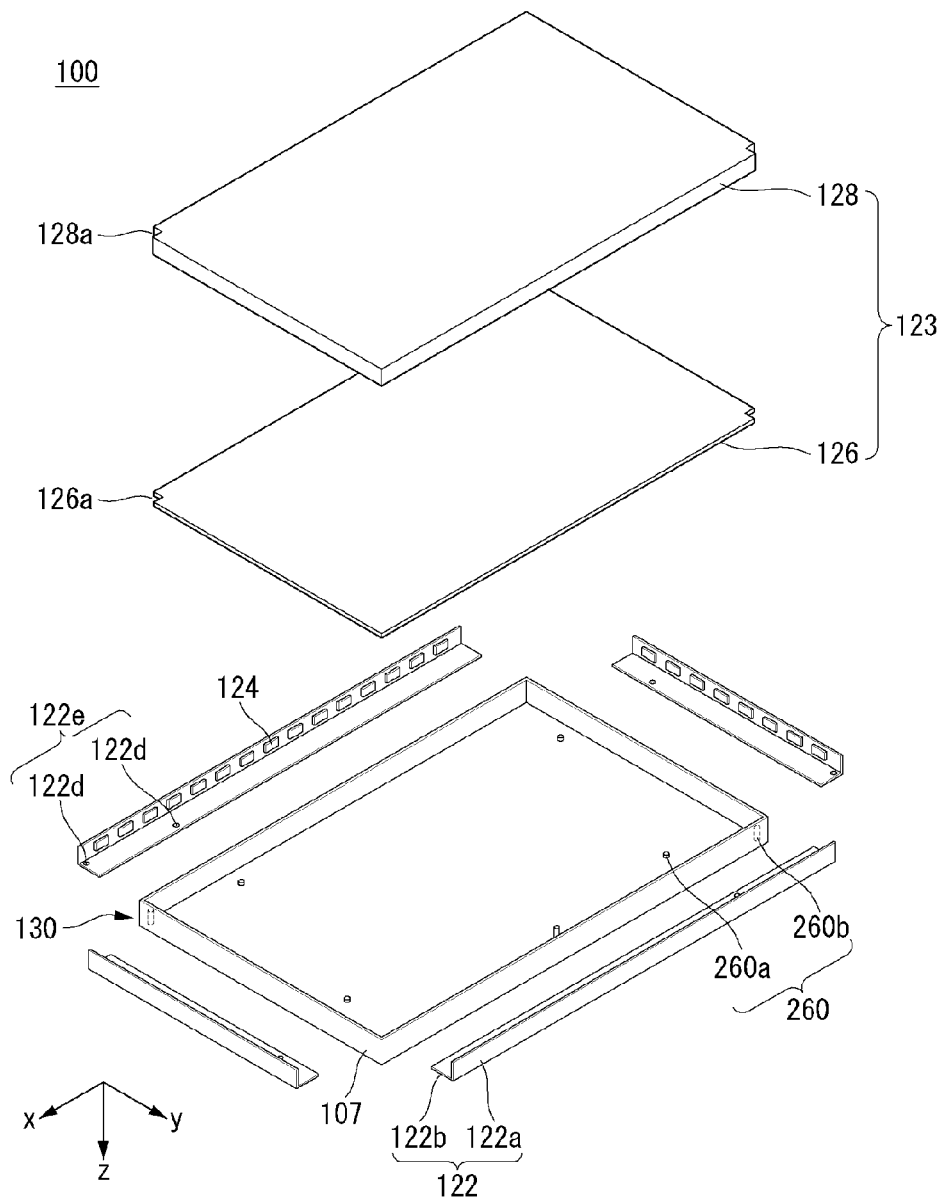

As shown in FIG. 37, the second coupling protrusion 260b may be located in a corner area of the bottom cover 130. For example, at a corner at a diagonal line location, the second coupling protrusion 260b may be formed. Even in the reflection sheet 126 and the light guide plate 128, in each corner area, the first coupling hole 126a may be formed. That is, at a corner of the reflection sheet 126 and the light guide plate 128, the first coupling hole 126a of a form in which two surfaces are opened may be formed.

Figure 38:
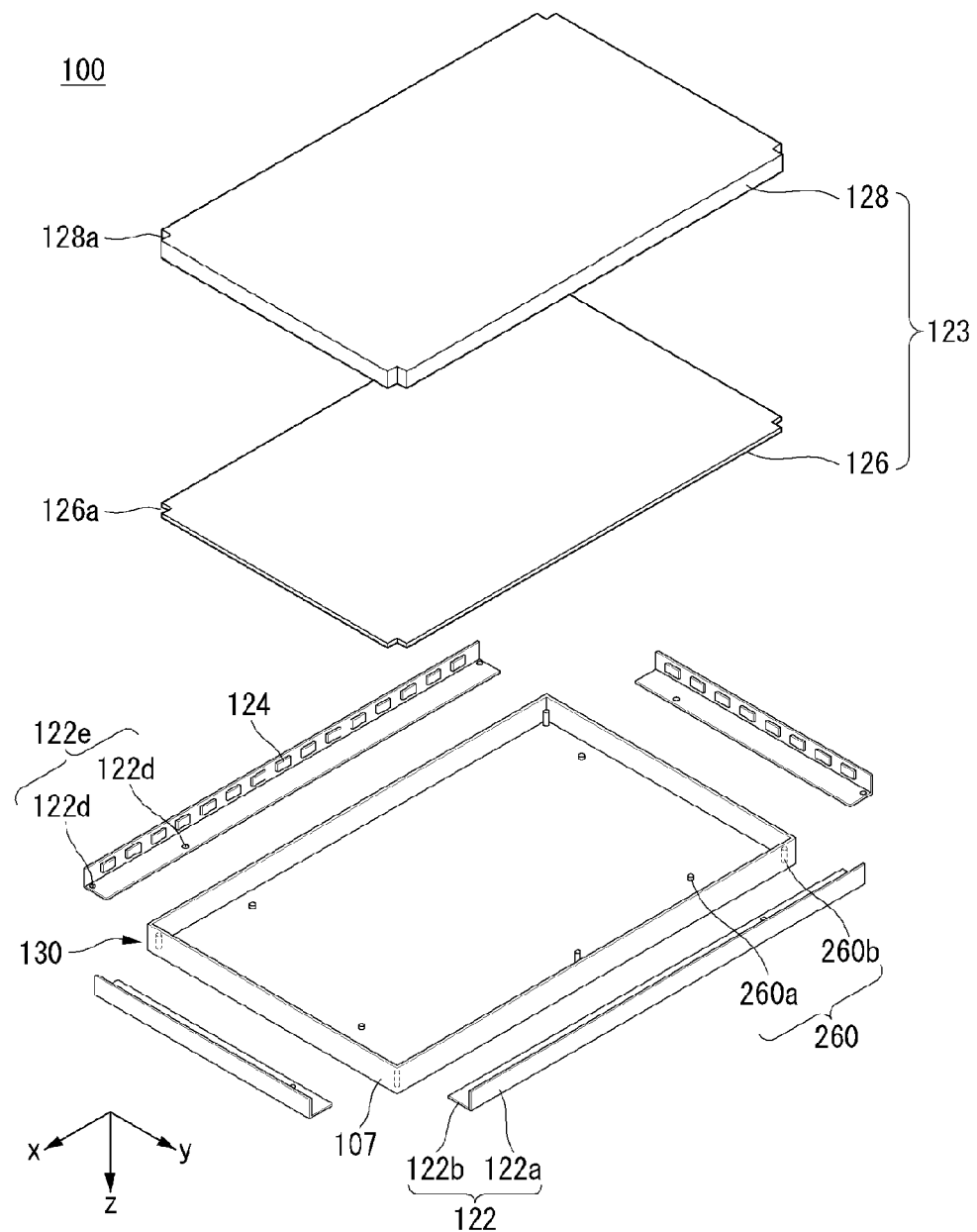

As shown in FIG. 38, the second coupling protrusion 260b may be located in each corner area of the bottom cover 130. Even in each corner of the reflection sheet 126 and the light guide plate 128, the first coupling hole 126a may be formed.

Figure 39:
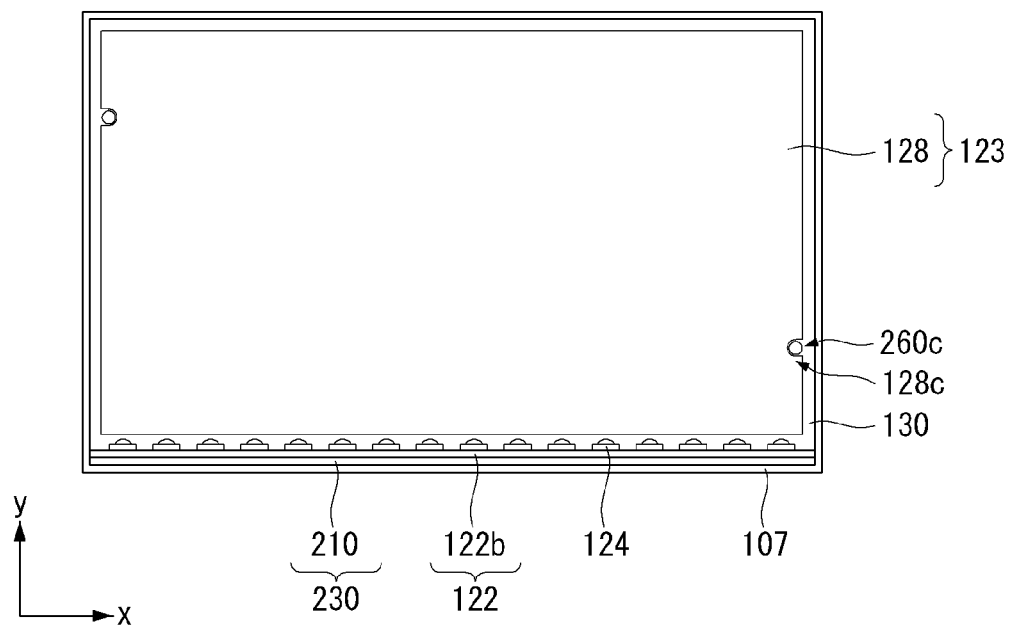

As shown in FIG. 39, the substrate 122 in which the light assembly 124 is provided may be disposed along one corner of the display device 100. For example, the substrate 122 may be disposed along the long side of the lower side.

A third coupling hole 260c may be protruded from the bottom cover 130. For example, the third coupling hole 260c may be protruded from the bottom cover 130 of the short side of the display device 100.

The third coupling hole 260c may fix the optical layer 123 to a specific location. For example, the third coupling hole 260c is inserted into a third coupling hole 128c of a side surface of the light guide plate 128 to prevent the light guide plate 128 from moving.

Figure 40:
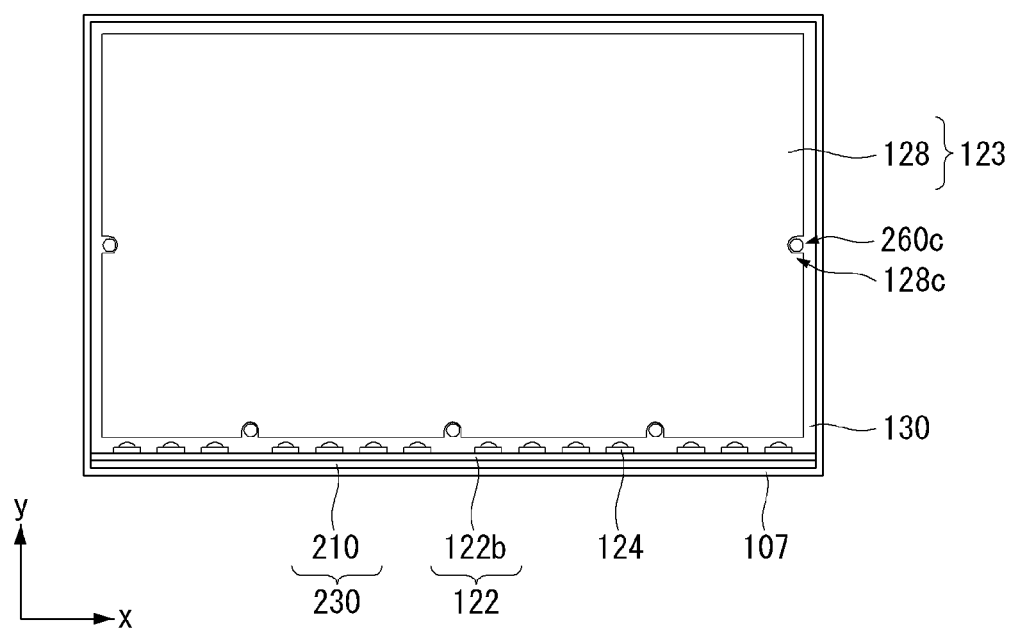
Figure 41:
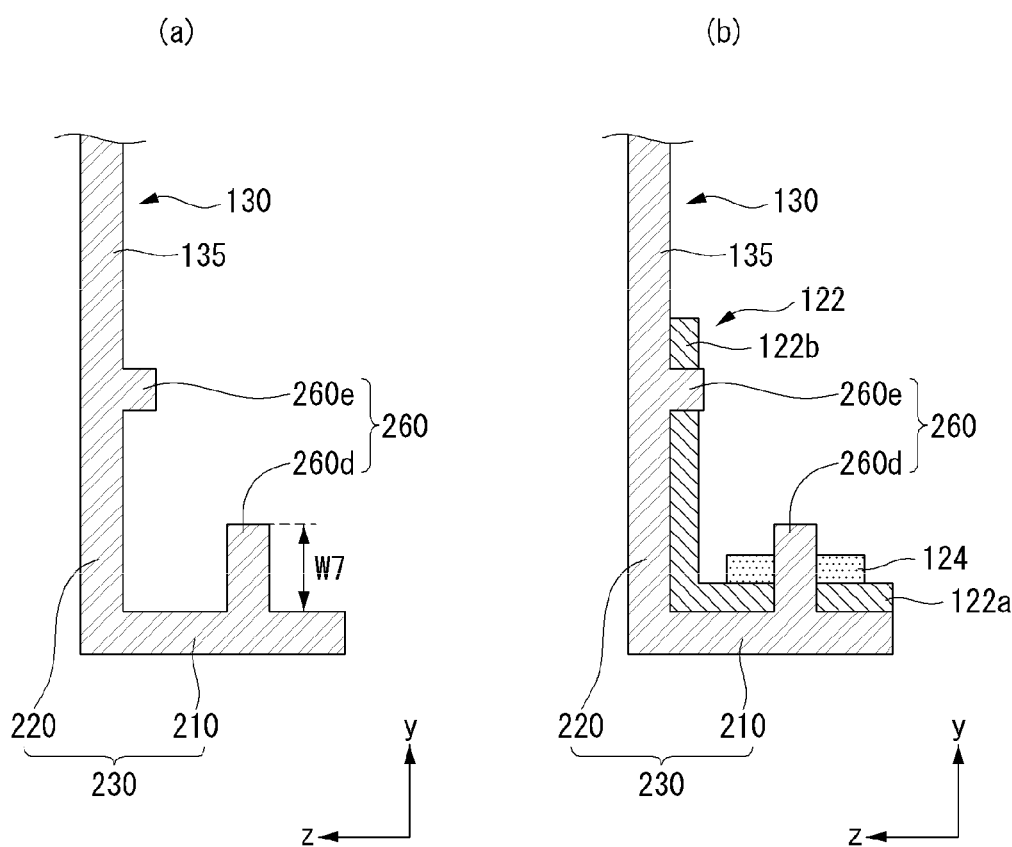

As shown in FIG. 40, the third coupling hole 260c may be located at both short sides and/or long sides. At the long side of the lower side to which a load is relatively applied, a plurality of third coupling holes 260c may be located.

As shown in FIG. 41A, in the bottom cover 130, fourth and fifth coupling protrusions 260d and 260e may be formed. For example, in the flange 210 of a Z-direction, the fourth coupling protrusion 260d may be protruded, and at the arriving surface 220 of a Y-direction, the fifth coupling protrusion 260e may be protruded.

As shown in FIG. 41B, the substrate 122 may be coupled to the fourth and fifth coupling protrusions 260d and 260e.

Figure 42:
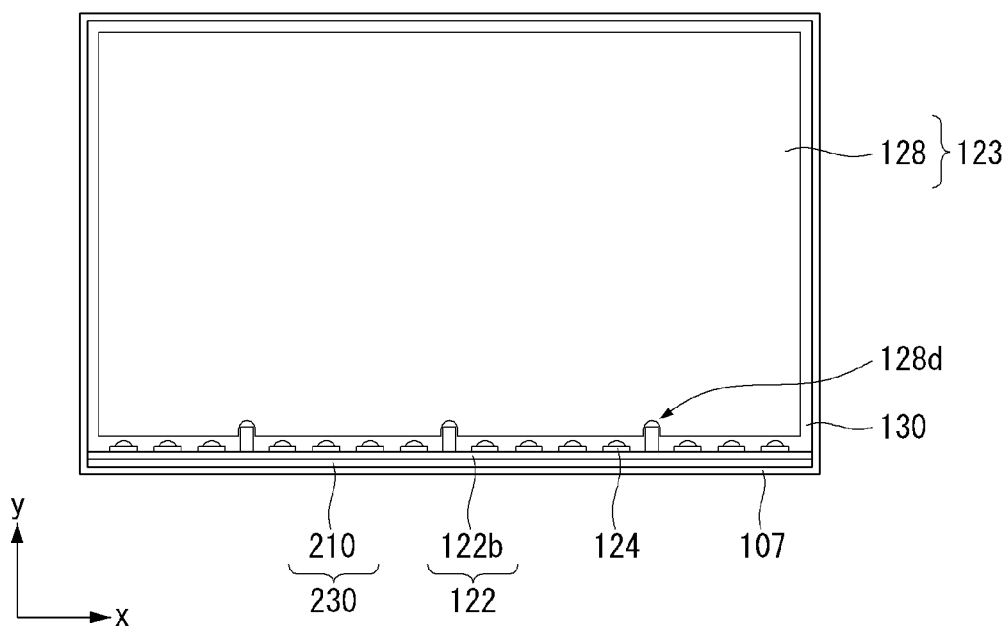

As shown in FIG. 42, the fourth coupling protrusion 260d may contact the optical layer 123 at a side surface of the optical layer 123. That is, the fourth coupling protrusion 260d may support the optical layer 123 in a Y-direction. The fourth coupling protrusion 260d may be separately disposed in the plural along the substrate 122. The fourth coupling protrusion 260d may constantly maintain a gap between the optical layer 123 and the light assembly 124.

In the optical layer 123, a fourth coupling hole 128d corresponding to the fourth coupling protrusion 260d may be formed. For example, at a corner of the light guide plate 128, the fourth coupling hole 128d may be formed.

Figure 43:
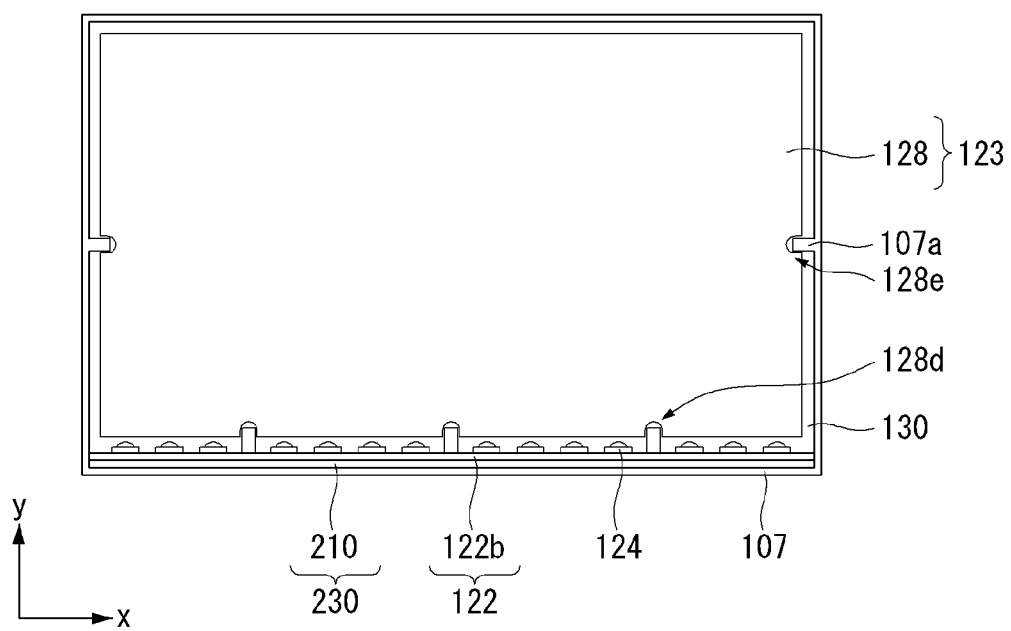

As shown in FIG. 43, the fifth coupling protrusion 107a contacting the optical layer 123 may be formed. The fifth coupling protrusion 107a may be located at a corner different from that of the fourth coupling protrusion 260d. For example, the fifth coupling protrusion 107a may be located at the short side of the display device 100. The fifth coupling protrusion 107a may be protruded from the side cover 107. However, the fifth coupling protrusion 107a may be protruded from the bottom cover 130.

Figure 44:
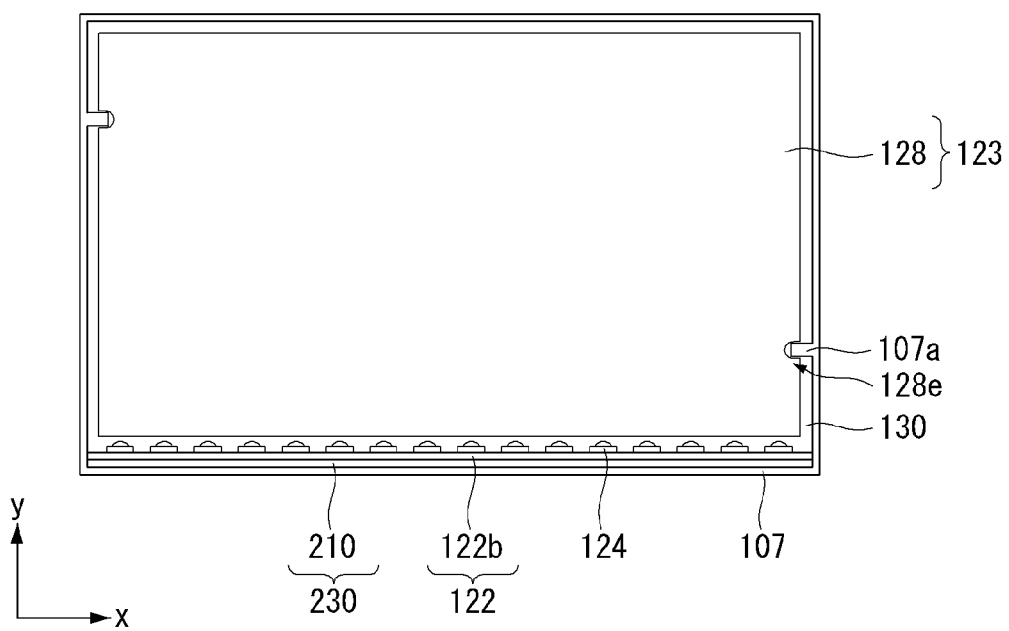

As shown in FIG. 44, only the fifth coupling protrusion 107a may be provided. That is, at a corner other than a corner in which the substrate 122 is located, the fifth coupling protrusion 107a may be located. For example, at both short sides of the display device 100, the fifth coupling protrusion 107a is provided to support the optical layer 123.

Figure 45:
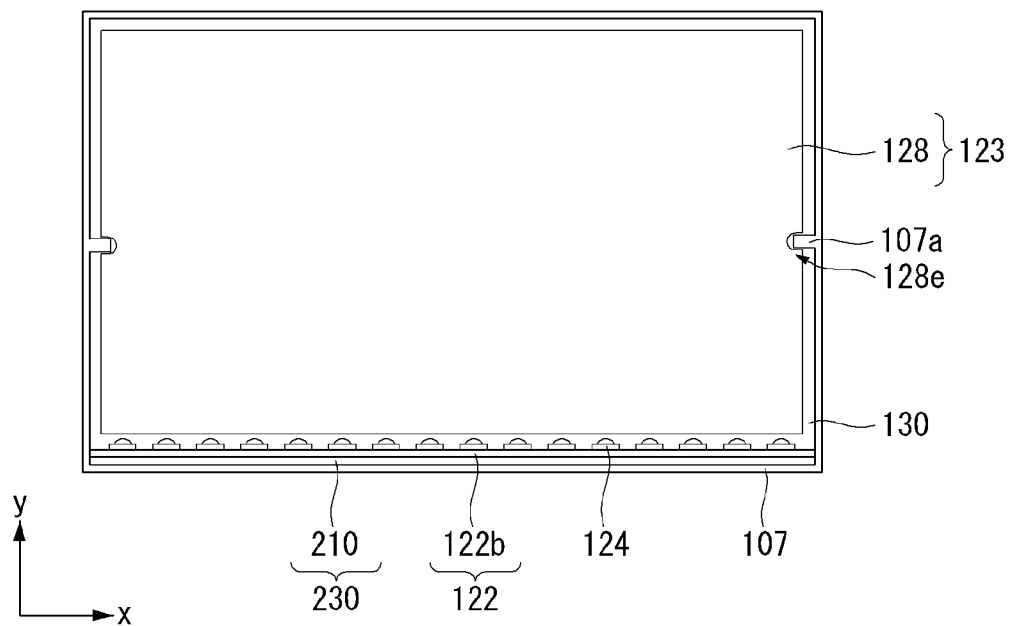

As shown in FIG. 45, the fifth coupling protrusion 107a may be provided at an opposite location of both sides of a corner of the short side. For example, the fifth coupling protrusion 107a may be located at an area other than a corner in which the substrate 122 is located. The fifth coupling protrusion 107a of FIG. 45 is different from the fifth coupling protrusion 107a of FIG. 44 asymmetrically disposed at both sides of a corner of the short side.

Figure 46:
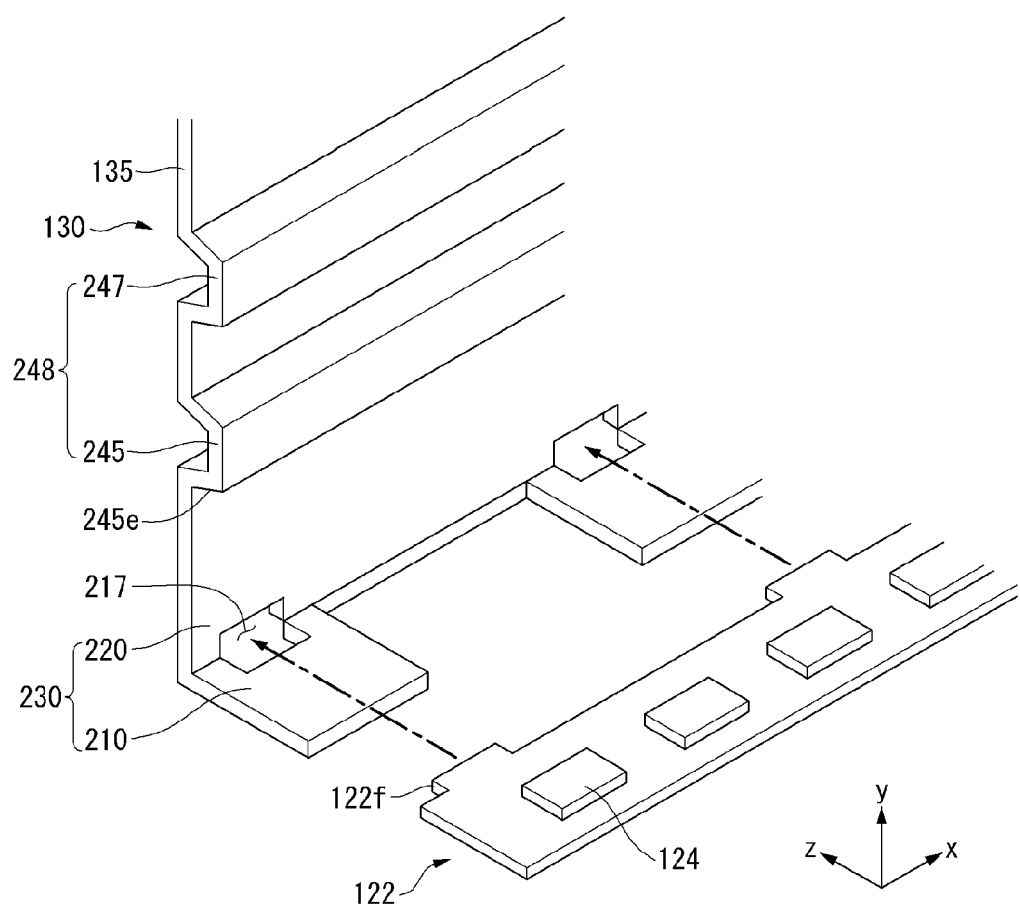

As shown in FIG. 46, in the bottom cover 130, a coupling groove 217 may be formed. The coupling groove 217 may be located in an area corresponding to the flange 210. For example, the coupling groove 217 may have a form in which a portion of a corner area in which the flange 210 and the arriving portion 220 contact is removed. The coupling groove 217 may be coupled to a coupler 122f formed in the substrate 122. By coupling the coupling groove 217 and the coupler 122f, the substrate 122 may be fixed to the bottom cover 130.

Figure 47:
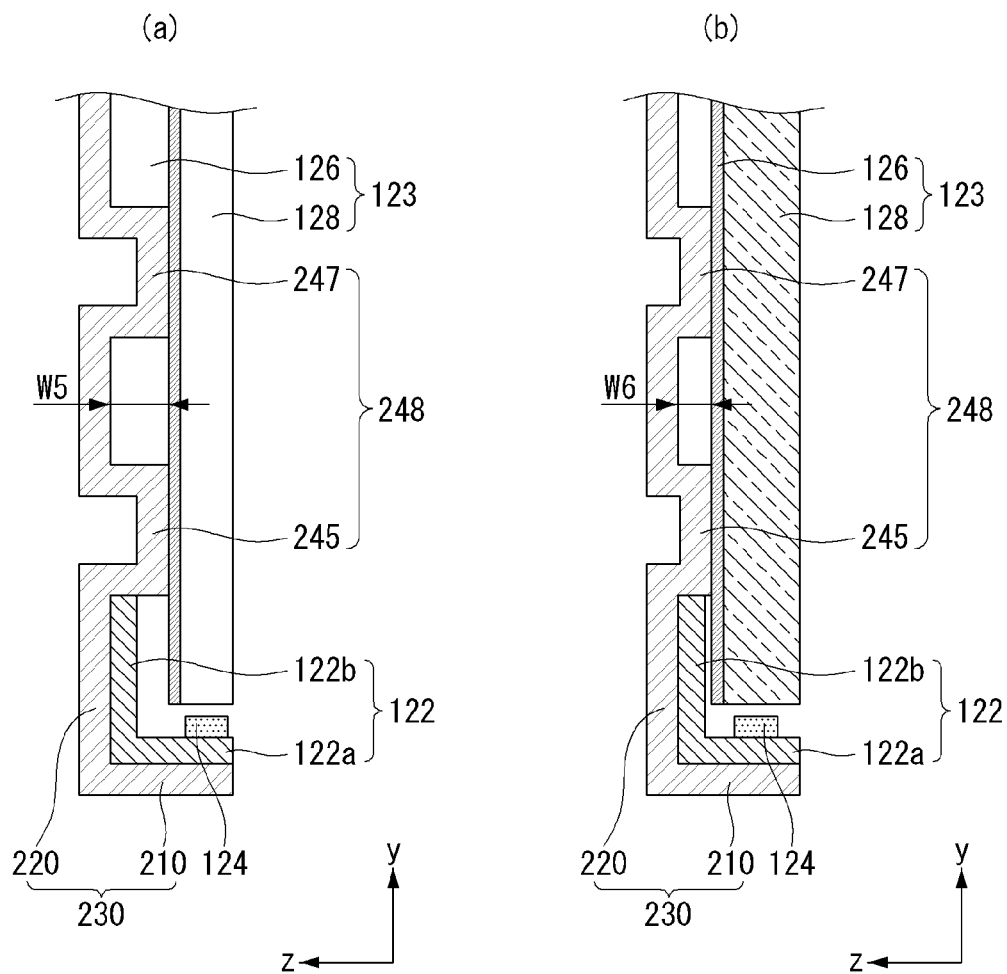
FIG. 47 is a cross-sectional view illustrating a forming structure according to an exemplary embodiment of the present disclosure.

FIG. 47 is a diagram illustrating a forming structure according to an exemplary embodiment of the present disclosure.

As shown in FIG. 47, the display device 100 according to an exemplary embodiment of the present disclosure may change a shape of the forming portion 248 to correspond to a necessary location of the optical layer 123.

As shown in FIG. 47, the optical layer 123 may be received in the forming portion 248. For example, at an upper side surface of the forming portion 248, the reflection sheet 126 may directly contact and the light guide plate 128 may be located thereon.

A height of the forming portion 248 may correspond to a necessary location of the optical layer 123. For example, a height of the forming portion 248 may be changed according to a size of the display device 100, a characteristic of the light assembly 124, and a characteristic of the optical layer 123. The display device 100 according to an exemplary embodiment of the present disclosure may form a height of the forming portion 248 in W5, as shown in FIG. 47A or may form a height of the forming portion 248 in W6, as shown in FIG. 47B. When differently forming a height of the forming portion 248, the optical layer 123 may be raised to a location thereof. More conveniently, a location of the optical layer 123 and/or a location of the light assembly 124 may be designed.

A height of the forming portion 248 may correspond to a location of the light assembly 124. For example, a height of the forming portion 248 may be changed according to a case in which the light assembly 124 is relatively leaned in −Z-direction and an opposite case. Therefore, the degree of freedom of a design can be easily secured.

As broadly described and embodied herein, provided is a display device including: a bottom cover; a backlight unit in which a light assembly is disposed in at least one corner area of the bottom cover; and a light arriving portion formed by bending at least one corner area of the bottom cover, wherein the backlight unit includes: a substrate coupled to the light arriving portion and in which a first surface in which the light assembly is disposed and a second surface bent from the first surface are provided, and at the first and second surfaces, a plurality of leads connected to the light assembly are disposed.

The light arriving portion may include: an arriving surface parallel to a plate area of the bottom cover; and a flange bent from the arriving surface.

A plurality of flanges may be separately disposed along the corner area.

Separation gaps of at least two and other at least two of the plurality of flanges may be different.

At the second surface, a plurality of leads connected to a light source mounted at the first surface and at least one connector area that connects the plurality of leads to the outside of the substrate may be provided.

At least one of the connector area may be located on a corner of the second surface to be parallel to the second surface.

At the second surface, in an area that is not overlapped with the plurality of leads, an electronic element may be mounted.

The bottom cover may further include at least one forming portion protruded in a direction of the backlight unit from the bottom cover.

The display device may further include an optical layer including a reflection sheet and a light guide plate located on the reflection sheet, wherein the reflection sheet may contact on the forming portion.

In the forming portion, an opening that inserts a connector area provided at the second surface may be provided.

The display device may further include an adhesive layer located between the substrate and the light arriving portion.

The light arriving portion may further include at least one coupling protrusion extended in a direction of at least one of the first and second surfaces from the light arriving portion and inserted into a coupling hole formed in the substrate.

The display device may further include an optical layer located at a front surface of the bottom cover, wherein at least one of the at least one coupling protrusion may be coupled to the optical layer by penetrating at least one of the first and second surfaces.

The optical layer may include: a reflection sheet; and a light guide plate located at a front surface of the reflection sheet, wherein in at least one of the reflection sheet and the light guide plate, a coupling hole that inserts the at least one coupling protrusion may be formed.

The display device may further include an optical layer located at a front surface of the bottom cover, wherein in a corner area of the bottom cover, at least one coupling protrusion protruded in a direction of the optical layer from the bottom cover to be coupled to the optical layer may be provided.

Another embodiment of the present disclosure provides a backlight unit including: a substrate disposed in at least one corner area of a bottom cover; a light assembly disposed on the substrate; and an optical layer located at a front surface of the bottom cover, wherein the substrate is coupled to a light arriving portion provided in the at least one corner area and includes a first surface in which the light assembly is disposed and a second surface bent from the first substrate surface, and at the first and second surfaces, a plurality of leads connected to the light assembly are disposed.

At the second surface, a plurality of leads connected to a light source mounted in the first surface and at least one connector area that connects the plurality of leads to the outside of the substrate may be provided.

The backlight unit may further include an adhesive layer located between at least one surface of the first and second surfaces and the light arriving portion.

The optical layer may include: a reflection sheet; and a light guide plate located at a front surface of the reflection sheet, wherein in at least one of the reflection sheet and the light guide plate, at least one coupling hole that inserts at least one coupling protrusion extended from the bottom cover may be formed.

The at least one coupling hole may be located at a corner area of the reflection sheet and the light guide plate.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
   a panel;
   a bottom cover disposed at a rear of the panel, the bottom cover having a planar surface and a sidewall bent from the planar surface;
   a substrate including a first surface disposed on the side wall and a second surface bent from the first surface;
   a light assembly disposed on the first surface; and
   a plurality of leads electrically connected to the light assembly and disposed at the first surface and the second surface of the substrate,
   wherein the bottom cover includes a ribbed portion that protrudes toward the panel, and the ribbed portion includes a protruded surface, and
   wherein the second surface is between the planar surface and the protruded surface.

2. The display device of claim 1, wherein the side wall includes a plurality of side walls which are separately disposed along the corner area, a corner area, and
   wherein the corner area is formed by the planar surface and the side wall, and the corner area being formed to extend along one side of the bottom cover.

3. The display device of claim 2, wherein separation gaps between at least two of the plurality of side walls are different than separation gaps between another at least two of the plurality of side walls.

4. The display device of claim 1, wherein the second surface of the substrate includes at least one connector area having a prescribed shape to provide external connection for the plurality of leads.

5. The display device of claim 3, wherein one or more of the at least the connector area is located near a corner of the second surface of the substrate and is parallel to the second surface of the substrate.

6. The display device of claim 3, wherein one or more electronic elements are mounted on the second surface of the substrate, in an area that does not overlap the plurality of leads.

7. The display device of claim 1, wherein the ribbed portion protrudes in a direction of the backlight unit from the bottom cover and extends along a front surface of the bottom cover.

8. The display device of claim 1, further comprising an optical layer including a reflection sheet and a light guide plate provided on the reflection sheet,
   wherein the reflection sheet contacts the ribbed portion.

9. The display device of claim 3, wherein in the ribbed portion, an opening is provided to accommodate a connector area provided at the second surface of the substrate, and
   wherein the connector area is exposed to a backward of the bottom cover.

10. The display device of claim 1, further comprising an adhesive layer provided between the substrate and the bottom cover.

11. The display device of claim 1, wherein the bottom cover includes at least one coupling protrusion that extends in a direction of at least one of the first or second surfaces of the substrate from the bottom cover and configured to be inserted into a coupling hole formed in the substrate.

12. The display device of claim 11, further comprising an optical layer provided at a front surface of the bottom cover,
wherein one or more of the at least one coupling protrusion is coupled to the optical layer by penetrating at least one of the first and second surfaces of the substrate.

13. The display device of claim 12, wherein the optical layer includes
a reflection sheet; and
a light guide plate provided at a front surface of the reflection sheet,
wherein, in at least one of the reflection sheet or the light guide plate, a coupling hole is formed to receive the at least one coupling protrusion.

14. The display device of claim 1, further comprising an optical layer provided at a front surface of the bottom cover,
wherein, in one corner area of the bottom cover, at least one coupling protrusion is provided to protrude in a direction of the optical layer from the bottom cover to be coupled to the optical layer.

15. The display device of claim 1, wherein the bottom cover includes a coupler disposed in an end portion of the side wall, and the coupler is formed by bending the side wall.

* * * * *